(12) United States Patent  
Hornberger et al.

(10) Patent No.: US 7,965,522 B1  
(45) Date of Patent: Jun. 21, 2011

(54) LOW-LOSS NOISE-RESISTANT HIGH-TEMPERATURE GATE DRIVER CIRCUITS

(75) Inventors: Jared Hornberger, Springdale, AR (US); Brad Reese, Prairie Grove, AR (US); Edgar Cilio, Farmington, AR (US); Roberto Marcelo Schupbach, Fayetteville, AR (US); Alex Lostetter, Fayetteville, AR (US); Sharmila Mounce, Fayetteville, AR (US)

(73) Assignee: Arkansas Power Electronics International, Inc., Fayetteville, AR (US)

( * ) Notice: Subject to any disclaimer, the term of this patent is extended or adjusted under 35 U.S.C. 154(b) by 83 days.

(21) Appl. No.: 12/586,729

(22) Filed: Sep. 25, 2009

Related U.S. Application Data

(60) Provisional application No. 61/194,484, filed on Sep. 26, 2008.

(51) Int. Cl.  
*H02M 3/335* (2006.01)

(52) U.S. Cl. ..................................................... 363/21.1

(58) Field of Classification Search .................. 363/13, 363/15, 16, 20, 21.01, 21.04, 21.1, 21.11  
See application file for complete search history.

(56) References Cited

U.S. PATENT DOCUMENTS

| | | | |
|---|---|---|---|
| 5,055,722 A | 10/1991 | Latos et al. | 307/570 |
| 5,206,540 A | 4/1993 | De Sa e Silva et al. | 307/127 |
| 5,550,436 A | 8/1996 | Houk | 315/209 |
| 5,900,683 A | 5/1999 | Rinehart et al. | 307/129 |
| 6,510,062 B2 * | 1/2003 | Goder et al. | 363/21.11 |

* cited by examiner

*Primary Examiner* — David Mis  
(74) *Attorney, Agent, or Firm* — Keisling & Pieper PLC; David B. Pieper

(57) ABSTRACT

High temperature gate driving circuits with improved noise resistance and minimized loss are implemented with high temperature components with a reduced size magnetic isolation transformer. Input broad-pulse width modulated signals are converted to offsetting narrow pulses to cross the reduced size magnetic transformer minimizing isolation losses. One embodiment teaches time and voltage offset narrow single pulses that control a set and reset regeneration of the pulse width output on the secondary side of the transformer. Another embodiment teaches multiple concurrent voltage offset pulses to cross the transformer and charge a threshold capacitor for both filtering noise and controlling the pulse width regeneration on the secondary side of the transformer.

16 Claims, 35 Drawing Sheets

Modification to the principle of operation of Gate Drive Three.

Blocks of an isolated single gate drive circuit.

Circuit schematic for Gate Driver One.

Circuit schematic for Gate Driver Two.

Input and output signal of isolation stage used in Gate Driver Two.

Generation of complementary signal with dead time.

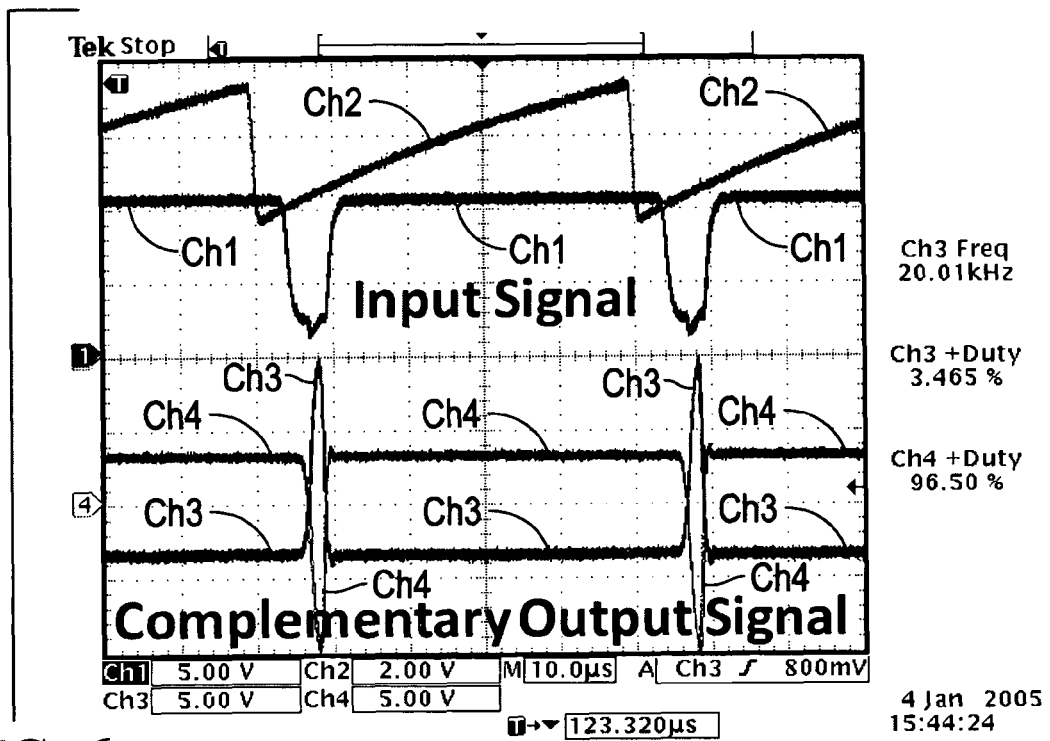
FIG. 6
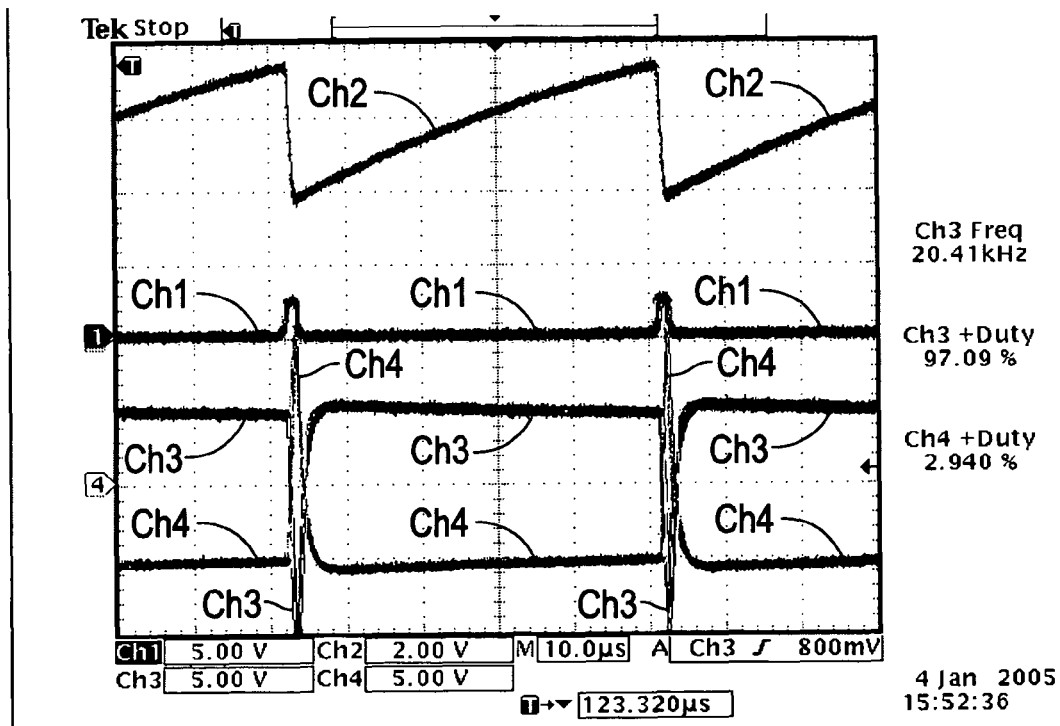
Captured complementary signal with dead time that were generated using the circuit in Figure 3.

Improved circuit for buffer block that deliver higher current.

Latest low-loss circuit for buffer block.

Non-linear amplifier developed using only NMOS devices used current capability of gate drive circuits.

FIG. 10  Complete gate driver circuit. Non-linear amplifier developed using only NMOS devices to boost the current capability of gate drive circuits.

Block-level diagram of Gate Drive Three.

Circuit schematic for the buffer/filter and inverter blocks.

Waveforms for the buffer/filter and inverter.

Circuit schematic showing triggering method for 555 timer.

Isolation transformer, pulse reconstruction, and set-reset flip-flop circuitry

Driver circuitry.

Waveforms for isolation, pulse reconstruction, and set-reset flip-flop circuitry.

Waveforms for driver circuitry.

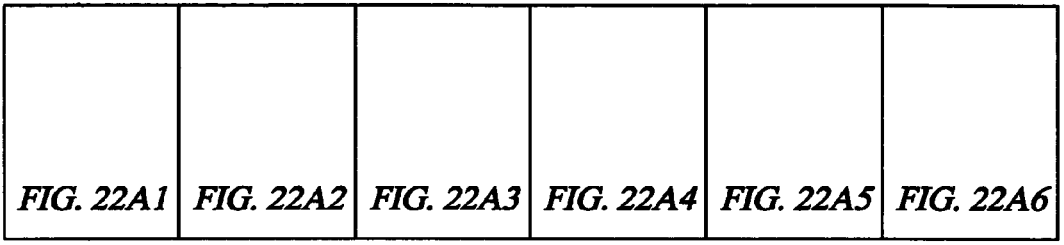
Gate Drive Three complete schematic.
FIG. 22A
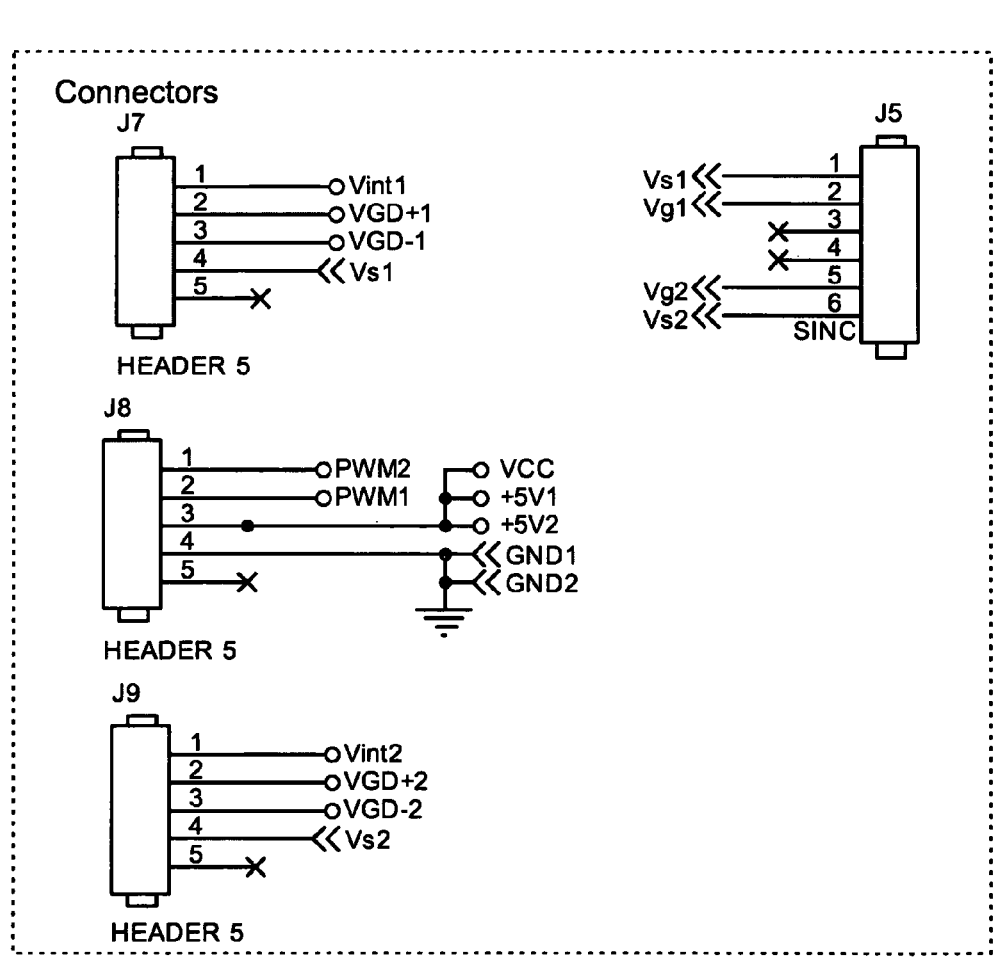
FIG. 22A1

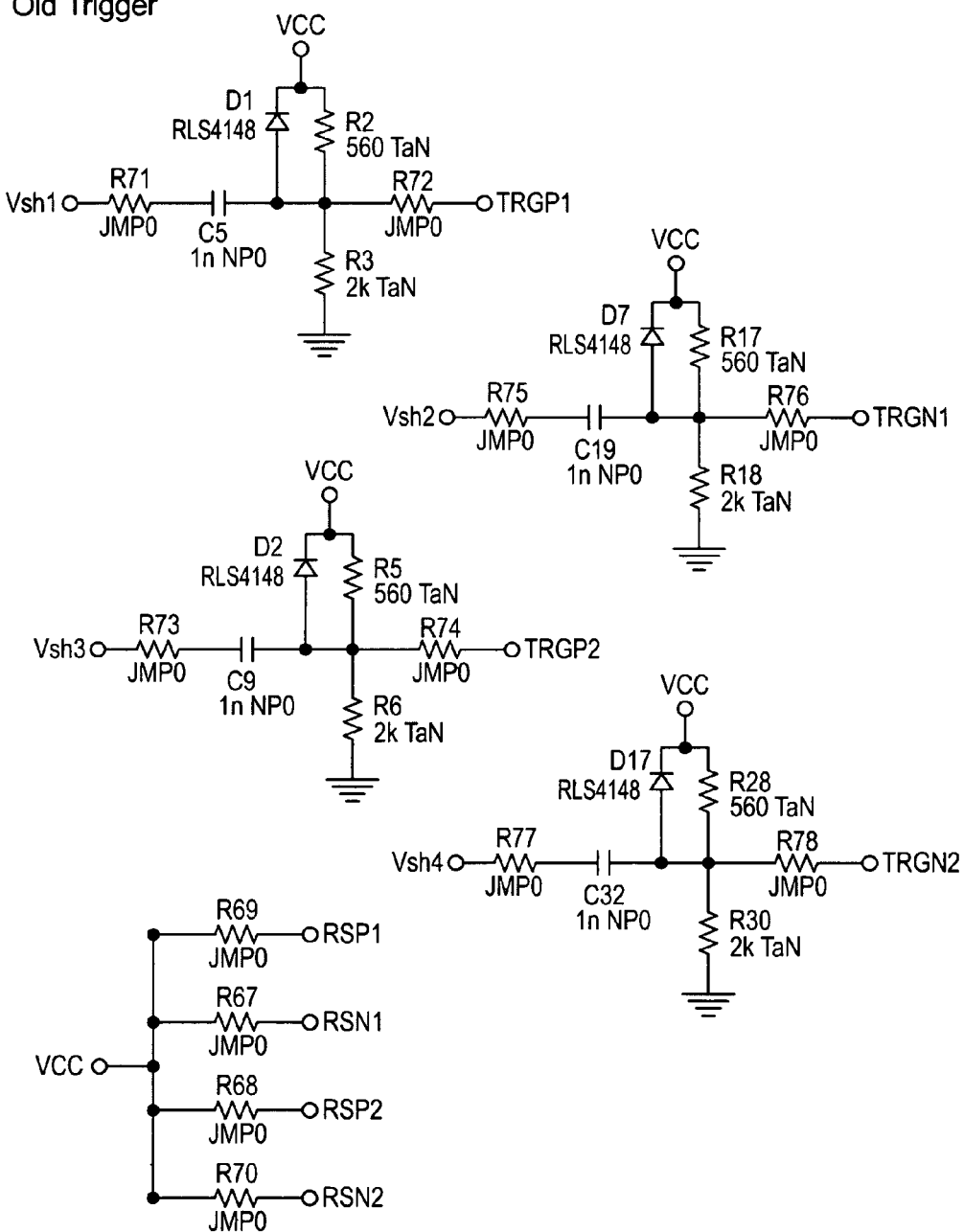
*FIG. 22A2*

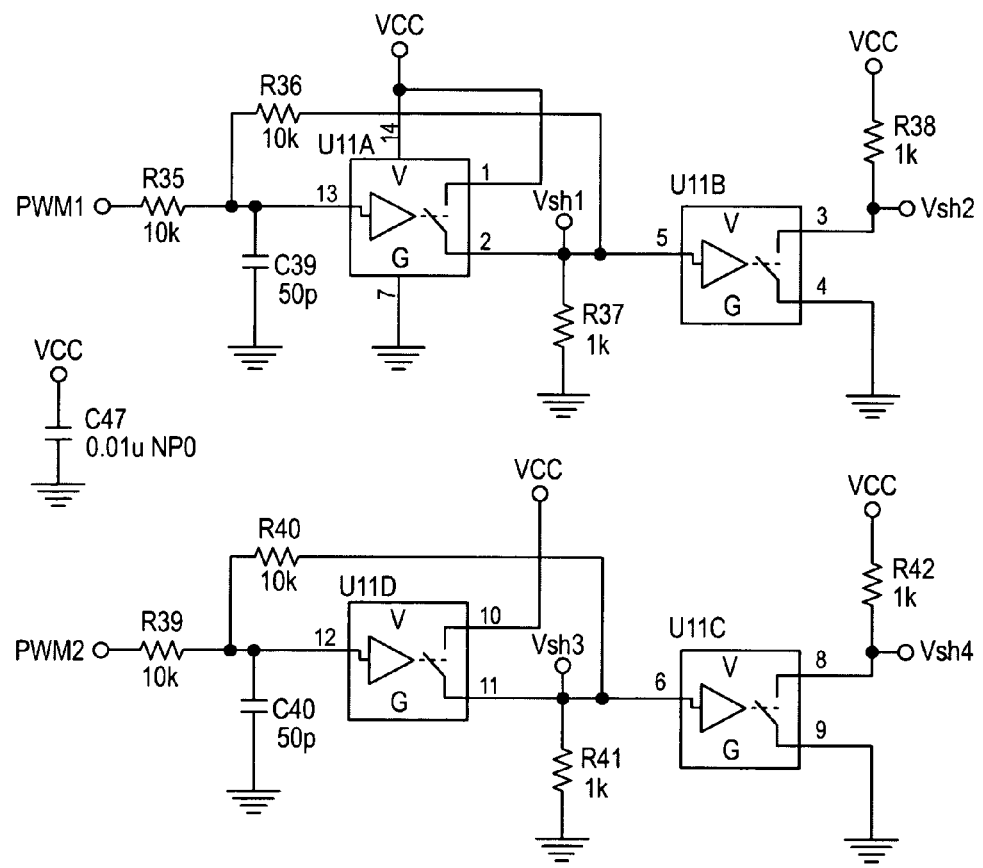
FIG. 22A3

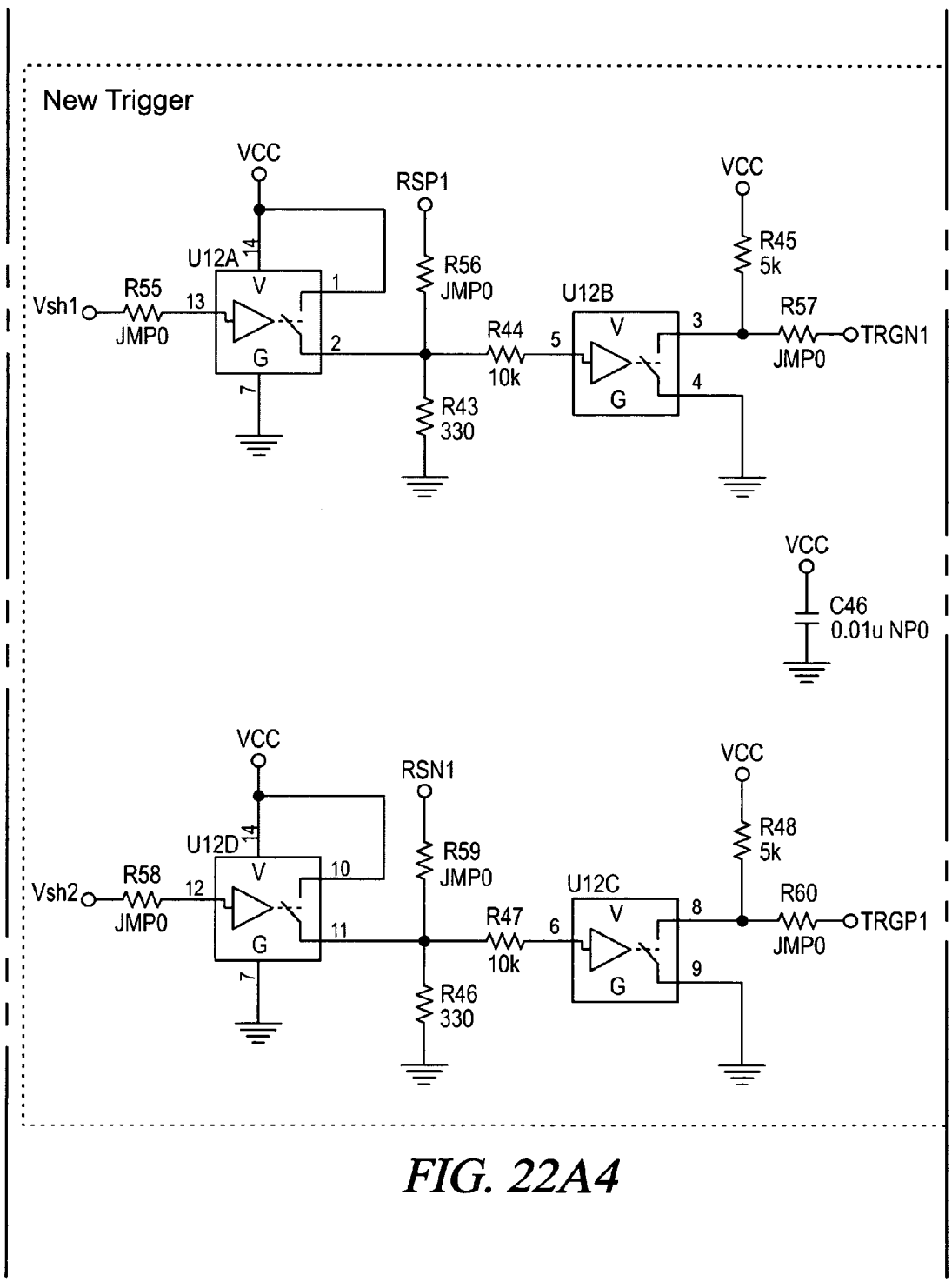
FIG. 22A4

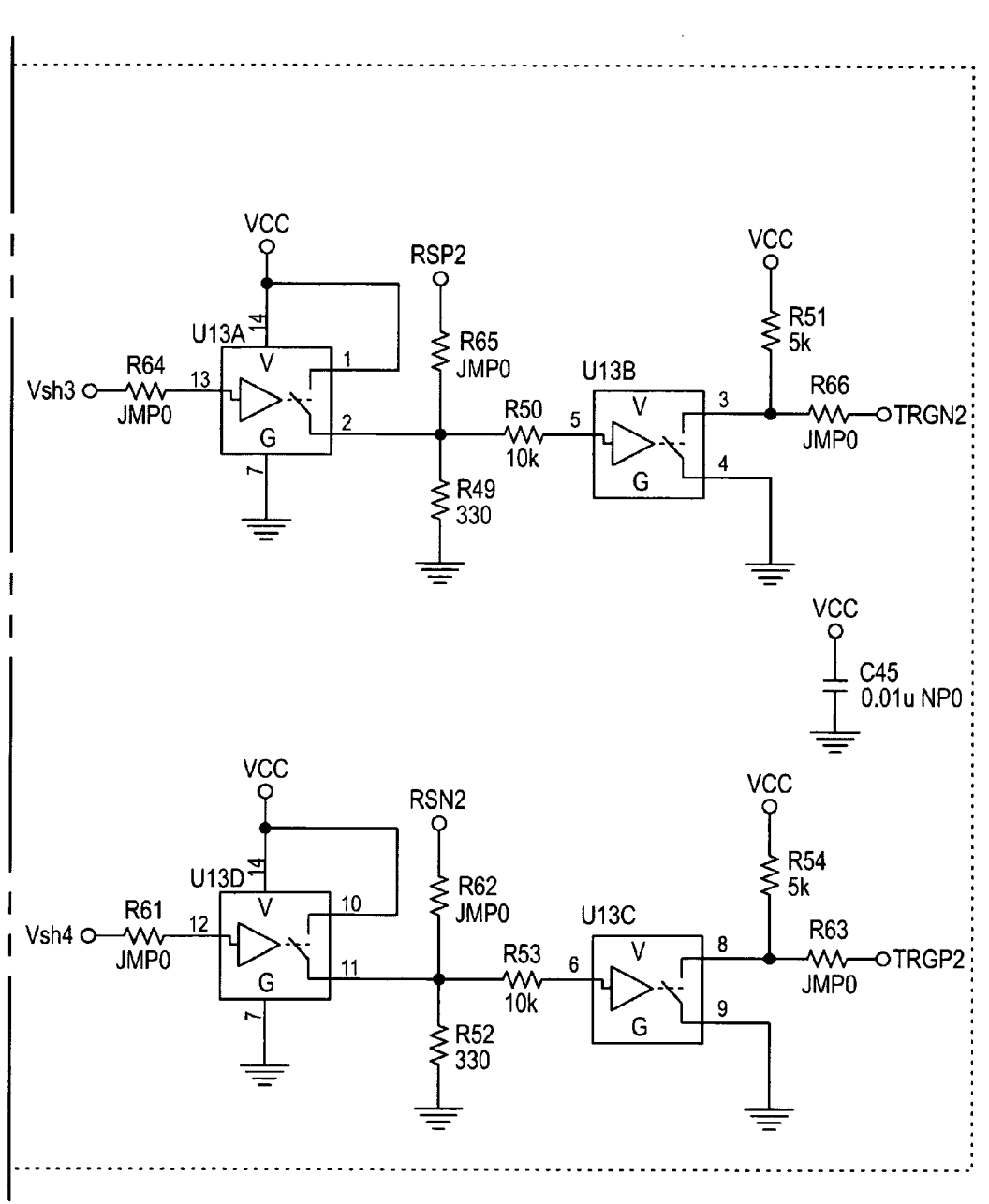
FIG. 22A5

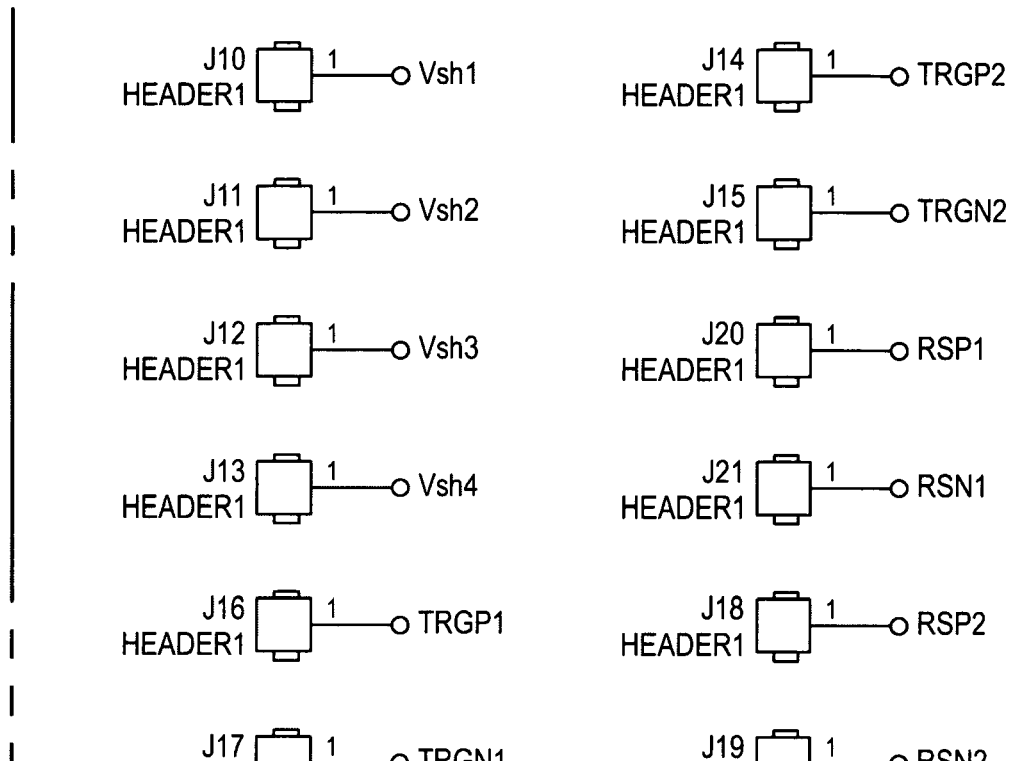
FIG. 22A6
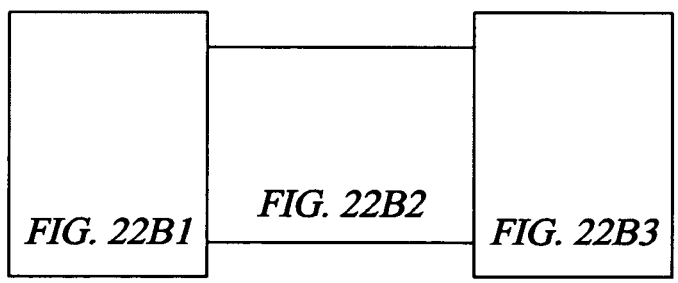
Gate Drive Three complete schematic.
FIG. 22B

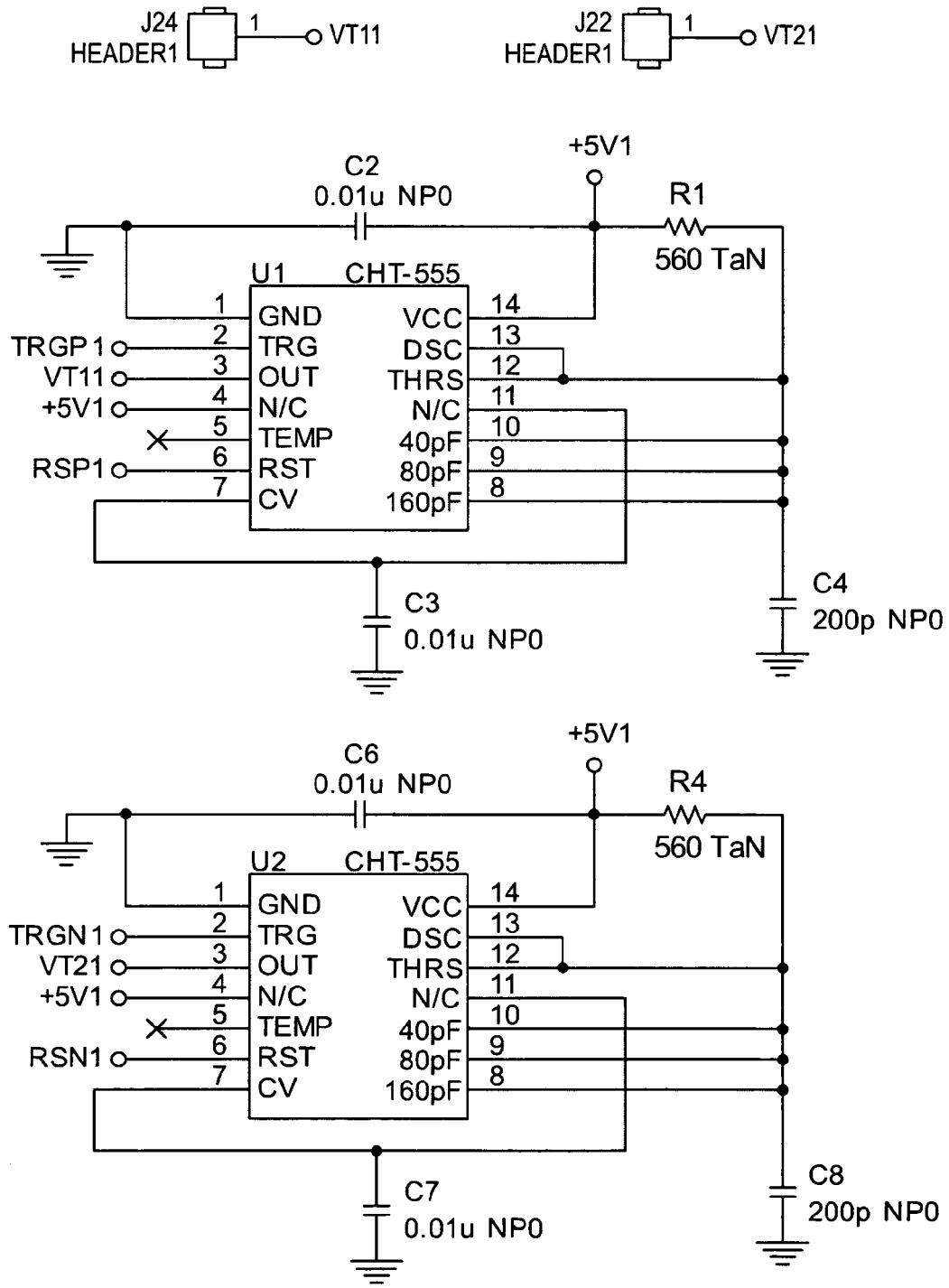
FIG. 22B1

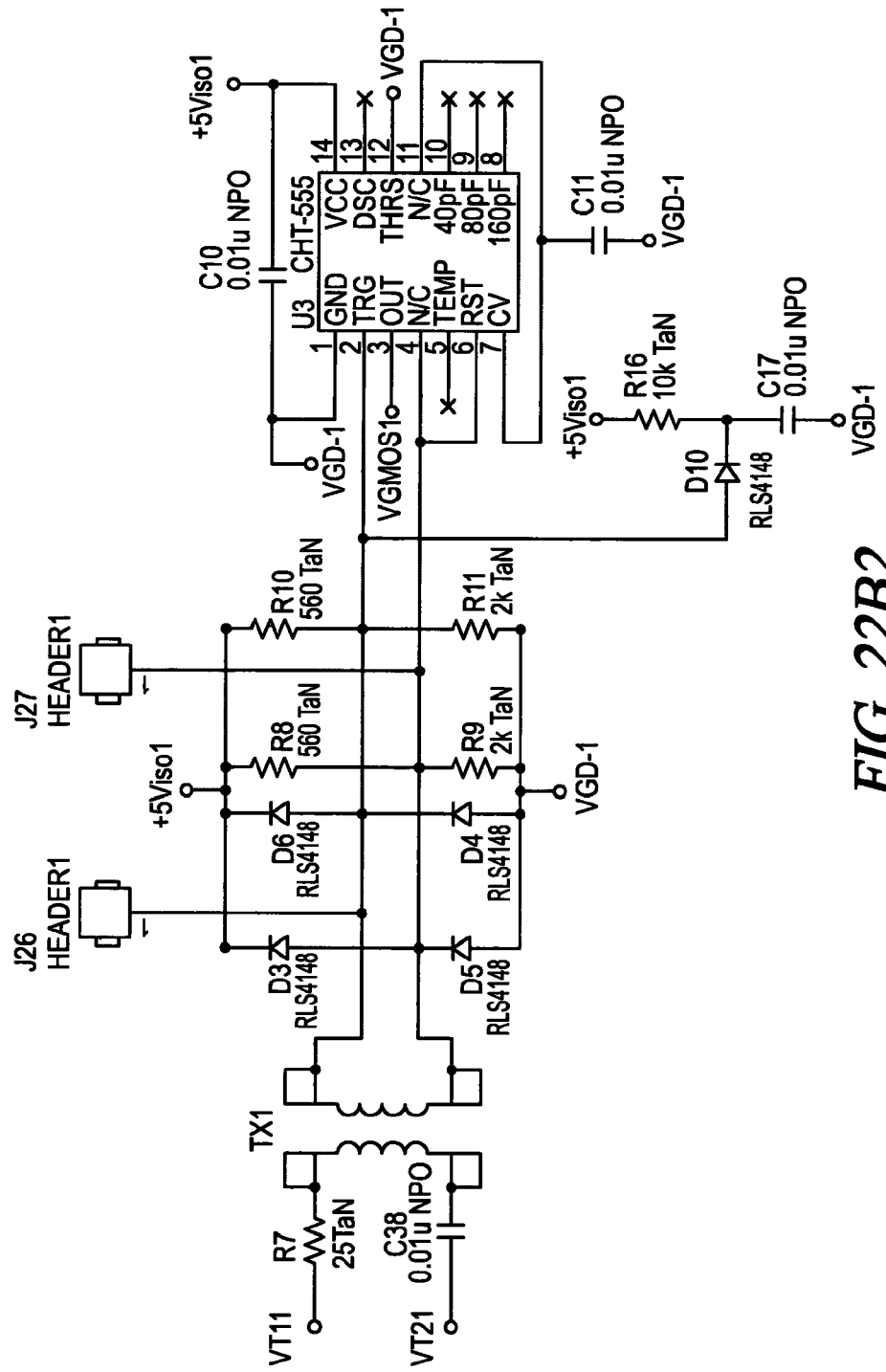
FIG. 22B2

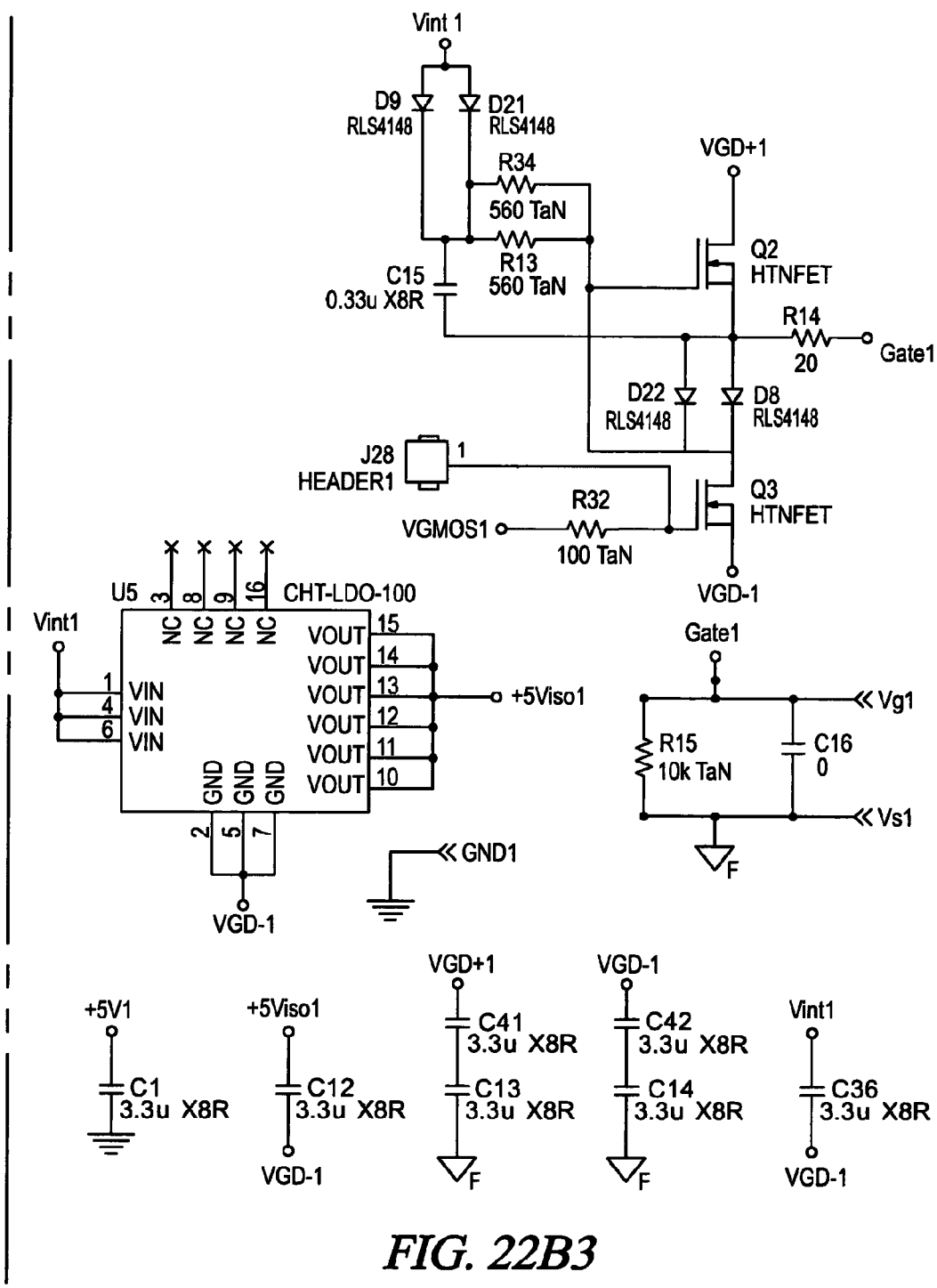
FIG. 22B3

Modification to the principle of operation of Gate Drive Three.

US 7,965,522 B1

LOW-LOSS NOISE-RESISTANT HIGH-TEMPERATURE GATE DRIVER CIRCUITS

CROSS-REFERENCE TO RELATED APPLICATIONS

This application claims priority of U.S. Provisional Application 61/194,484, filed Sep. 26, 2008 entitled HIGH TEMPERATURE GATE DRIVERS, which is hereby incorporated by reference in its entirety.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

The present invention relates to improvements in electric circuits. More particularly, the invention relates to improvements particularly suited for noisy and compact high-temperature environments. In particular, the present invention relates specifically to a unique circuit configuration developed using silicon on insulator based solid state components to provide a low-profile noise-resistant high-temperature operating environment electric gate driving circuit. This circuit model and the design techniques may also apply to future components such as HTSOI, SiC, BJTs, JFETs, MOSFETs, silicon carbide, gallium nitride, and the like.

2. Description of the Known Art

As will be appreciated by those skilled in the art, gate driving circuits are known in various forms. Patents include: U.S. Pat. No. 5,055,722, issued to Latos et al. on Oct. 8, 1991, entitled GATE DRIVE FOR INSULATED GATE DEVICE; U.S. Pat. No. 5,206,540 issued to de Sa e Silva et al. on Apr. 27, 1993 entitled TRANSFORMER ISOLATED DRIVE CIRCUIT; U.S. Pat. No. 5,550,436, issued to Houk on Aug. 27, 1996 entitled MOS GATE DRIVER INTEGRATED CIRCUIT FOR BALLAST CIRCUITS; and U.S. Pat. No. 5,900,683, issued to Rinchart et al. on May 4, 1999 entitled ISOLATED GATE DRIVER FOR POWER SWITCHING DEVICE AND METHOD FOR CARRYING OUT THE SAME. Each of these patents is hereby incorporated by reference in their entirety. These patents fail to teach the advantages, method, or apparatus of the present invention.

Relevant articles particular to the present invention include Shihong Park; Jahns, T. M., "A novel dead-time elimination method using single-input enhanced phase-leg configuration", 38th Industry Applications Conference, IAS 2003, Volume 3, Issue, 12-16 October 2003, pp. 2033-2040; and S. Round, M. Heldwein, J. Kolar, I. Hofsajer, and P. Friedrichs, "A SiC JFET Driver for a 5 kW, 150 kHz Three-Phase PWM Converter", IAS 2005, pp. 410-416. These articles are limited in their teachings.

Other application notes disclose information relevant to gate driving circuits. Typical integrated circuit (IC) designs are known such as IR2111 sold by INTERNATIONAL RECTIFIER of 233 Kansas Street, El Segundo, Calif. and their Application Note AN-978 provides a good background of the basic circuit layouts for gate drivers on Page 23. These gate driver ICs cannot be used reliably at ambient temperatures in excess of 150° C. due to the inability of the silicon-based circuit.

To address these issues, the present application presents a suite of high temperature gate driver circuits capable of operating at ambient temperatures up to 300° C. In addition to high temperature operation, some of these gate drivers were developed to address the specific needs of silicon carbide (SiC) devices.

SUMMARY OF THE INVENTION

The present invention is directed to an improved gate driving circuit using high temperature components. In accordance with one exemplary embodiment of the present invention, a gate driving circuit is provided using HTSOI components for high temperature environments. The invention teaches a buffer block, isolation technique, and drive block all implemented in unique constructions for the high temperature environment. Implementation with HTFETs, NMOS transistors, op-amps, analog switches, and 555 timers for the buffer, inverters, set-reset regeneration, and non-linear gate drivers are provided. Specifically, unique constructions for minimized transformer size are taught using pulse generation and reconstruction systems.

Another advantage of the invention is the teaching of a high current buffer block using HTSOI components with a capacitor controlled low loss totem-pole power delivery system.

Yet a further teaching of the present invention is the generation of narrow pulses to minimize transformer size for magnetic isolation in high temperature circuits.

A further teaching of the present invention is a high-low set-reset scheme taught in one embodiment of the invention to cross a minimally sized isolation transformer with secondary side pulse width reconstruction.

A still further embodiment of the invention teaches a non-saturating offset amplitude modulation signal for crossing a minimized transformer with a rectified signal reconstruction charging a noise filtering and threshold detecting capacitor for rebuilding the pulse width signal.

These and other objects and advantages of the present invention, along with features of novelty appurtenant thereto, will appear or become apparent by reviewing the following detailed description of the invention.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views:

FIG. 6 is a graphic view of the complementary signal with dead time for the circuit of FIG. 3.

FIGS. 22A, 22A1, 22A2, 22A3, 22A4, 22A5, 22A6, 22B, 22B1, 22B2, and 22B3 show the complete schematic for the set-rest circuit.

FIGS. 24, 24A, and 24B are the electrical schematic comparison between the set-rest schematic and the amplitude modulation circuit.

FIGS. 25, 25A, and 25B are the electrical schematic comparison between the set-rest reconstruction and the amplitude modulation circuit reconstruction.

FIGS. 26, 26A, 26B, and 26C are the complete electric circuit schematic for the amplitude modulation gate driver circuit.

DETAILED DESCRIPTION OF THE INVENTION

Figure 1:
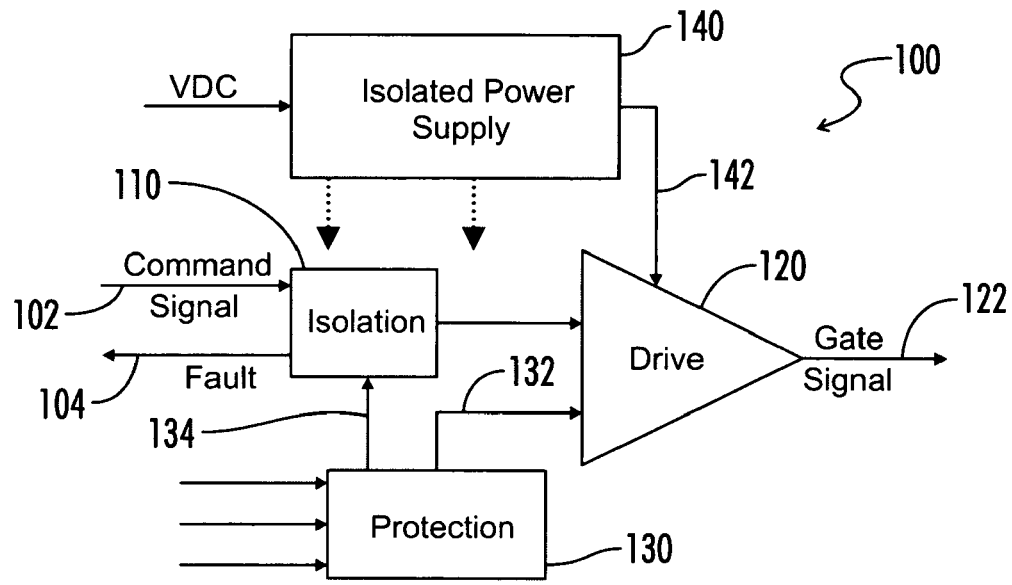
FIG. 1 is a block diagram of an isolated single gate drive circuit.

As shown in FIG. 1 of the drawings, a block diagram of an exemplary embodiment of the gate driver circuit 100 of the present invention is generally shown. The basics of the gate driver circuit 100 are composed of four major blocks, namely: isolation block 110, amplifier block 120, protection block 130, and the isolated power supply block 140. Below we give a short introduction of the main function of each block.

Isolation block 110. The main function of the isolation block 110 is to provide electrical isolation, also known as galvanic isolation, between the control signal 102 and the gate drive signal 122. Magnetically-coupled devices, such as signal or pulse transformers, offer higher performance and reliability than optically-coupled devices, in particular when considering wide temperature variations. Specifically, magnetically-coupled devices provide higher levels of isolation, higher dV/dt capability, smaller propagation delay and higher long-term reliability than optically-coupled devices. Unfortunately, magnetically coupled devices normally require additional circuitry to drive the signal transformer and decode or reconstruct the isolated signal. In addition, signal transformers are often custom designed in order to achieve the abovementioned high performance and high temperature operation. Lastly, magnetically-coupled devices may have a somewhat restricted duty cycle, no DC signals are allowed, unless additional coding and decoding circuitry is included. The present invention uses magnetically-coupled devices to achieve signal isolation with level-shift circuitries to change the reference level of a low-voltage control signal. This method is preferred when implementing an integrated circuit version of the gate driver circuits due to its highest level of integration.

Drive block 120. The main function of the drive block 120 is to provide the power signal to the gate of the power switch, such as a MOSFET, VJFET, etc. In general, this drive block 120 is a non-linear amplifier with a totem-pole output in order to achieve high peak-current capability. The three most relevant characteristics of the amplifier stage are (a) turn-on and turn-off times, (b) output resistance and (c) output inductance. The turn-on and turn-off times affect the overall delay time of the driver. The output resistance limits the maximum peak current capability of the driver while the output inductance limits the maximum rate of change, di/dt, of the output current.

Protection block 130. The main function of the protection block is to detect anomalies within the switching period and trigger a fault signal 132. In addition, in most cases the detected fault is also communicated by a feed back signal 134 converted to an isolated feedback signal 104 to the controller using a single signal for both high-side and low-side drivers. The type of protection required is device specific; in other words, the type of protection needed for a BJT is different than the one needed for a MOSFET or VJFET. Because these signals would be specific to the individual design, the present invention merely discloses this possibility.

Isolated Power Supply block 140. The main function of the isolated power supply block 140 is to provide isolated power 142 to the drive block 120. This isolated power supply 140 can be implemented by means of an isolated DC/DC converter or a boot-strap circuitry. The main advantage of using an isolated DC/DC converter as the power supply is the ability of supplying power under all duty cycles including DC; moreover, the implementation of a positive/negative, +/−, supply is simpler and more reliable. The main disadvantage of this approach is its complexity, footprint size and cost. The main advantage of using a boot-strap circuitry is its simplicity, footprint size and cost. The main drawback of using a boot-strap circuitry for this application is the implementation of a positive/negative, +/−, supply. In boot-strap circuitries, a negative gate voltage is normally obtained by means of AC coupling of the gate signal using capacitors and zener diodes. The AC coupling principles work well under steady-state operation, however, during the first few switching events or transients with the pulse width change, the capacitors may not be fully charged, thus yielding an improper negative voltage. Given the high-performance nature of this invention, a boot-strap circuitry is not recommended if footprint space is available for the isolated DC/DC converter.

Figure 2:
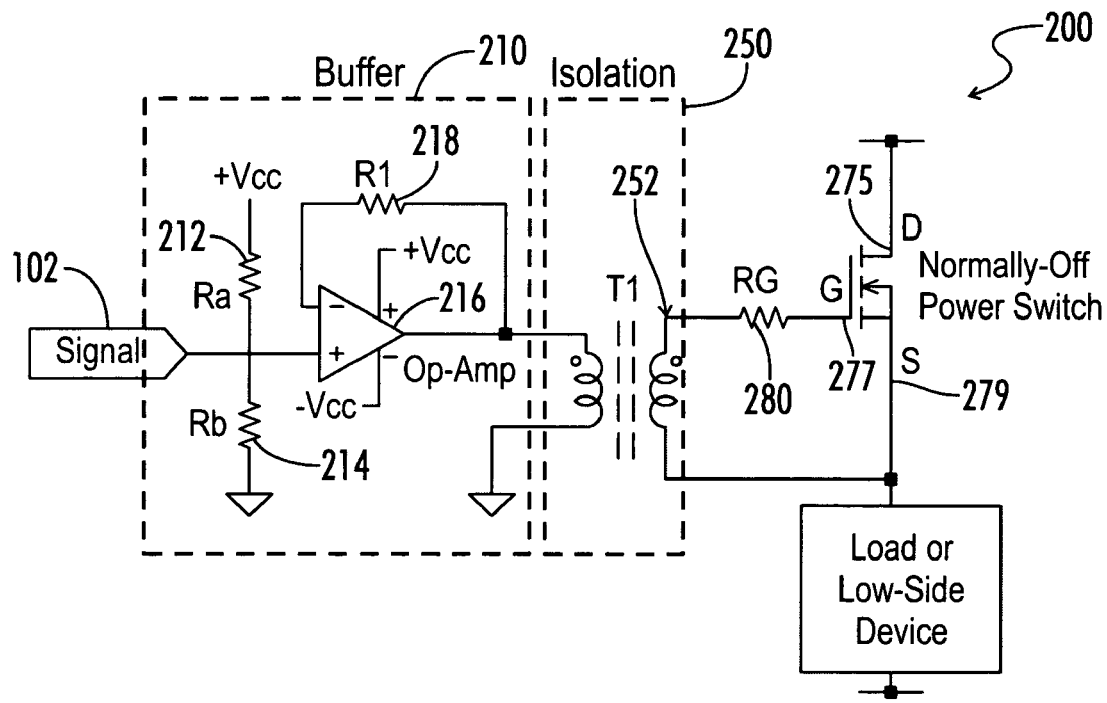
FIG. 2 is a circuit schematic for a simple high temperature gate driver with buffer and isolation.

FIG. 2 shows a simple high temperature, buffered, isolated single gate drive circuit 200. The single gate drive circuit 200 includes a buffer 210 and isolation circuit 250. The buffer 210 receives the input signal 102 to a voltage divider formed from first resistor A 212 and first resistor B 214 to feed the positive input of an op-amp 216. The op-amp 216 uses a feedback resistor 218. The isolation circuit 250 of the single gate drive circuit 200 uses a pulse transformer 252 to isolate the gate signal. Thus, this gate driver is divided into two blocks, namely, buffer and isolation. Note that the prior art did not teach a buffer block. Also note that this gate driver does not have an isolated supply block. The isolated power needed to drive the power switch 275 is provided by the isolation block 250. The input signal 102 generally comes from digital processing using a microcontroller or digital signal processor (DSP). This input signal is amplified by the operational amplifier 216 configured as a buffer. In the preferred embodiment, the op-amp terminal is set to +2.5V through the voltage divider network 212, 214. The other lead is connected to the input signal 102 from the microcontroller. The op-amps are connected to +/−5.0V rails (i.e., +Vcc and −Vcc) to give an output of +5.0V when the non-inverting terminal is greater than +2.5V and −5.0V when the non-inverting terminal is less than +2.5V. Utilizing the op-amp 216 in this fashion converts the original digital signal to an analog signal of equal magnitude, but with current drive capabilities. Finally, two op amps 216 may be placed in parallel to provide increased gate drive performance. The output signal of the op-amp 216 is fed into a pulse transformer 252 providing the signal isolation. The output of this transformer 252 is used to drive the gate of the power switch 275 by connecting the transformer output across the power device control terminal, Gate 277 and Source 279 via a gate resistor 280. This type of gate driver circuit is not commonly used anymore due to serious performance limitations. In particular, due to the Volt-second restriction of transformers, this gate driver circuit can only produce signals with a 50% duty cycle. To solve the high temperature op-amp issues, we used a commercially available high temperature silicon on insulator (HTSOI) op-amp from HONEYWELL, 12001 Highway 55, Plymouth, Minn. 55441. HONEYWELL and a second company, called CISSOID, Rue Emile Francqui, 3—B1435 Mont-Saint-Guibert—Belgium, have a suite of HTSOI components including op-amps, analog switches, voltage reference, linear regulators signal FETs, etc. that are rated to 225° C. continuous operation for 5 years and one year at 250° C. To solve the high temperature passive issue, we tested several commercially available components that are rated to standard temperatures (i.e., <150° C.) and selected the ones that can operate at 250° C. to 300° C. without much degradation. Ceramic on glass (COG) and NPO capacitors can be used at the temperature of interest. Most ceramic-base resistors (i.e., thick film and thin film) can also be used. To address the high temperature transformer issues, different magnetic cores and magnetic wire were investigated. The final design that was tested utilized HONEYWELL'S MAGNESIL toroidal core transformer rated to a maximum operational temperature of 500° C., Ceramawire 28-gauge ceramic coated magnetic wire rated to 600° C., and Lodestone Pacific phenolic toroidal core headers. The MAGNESIL core number 53086-4K was chosen for the preferred embodiment and was designed to have a 1:2 turn ratio. Since the signal produced by the buffer stage is a +/−5.0V signal, the gate driver signal was +10V to −10V. Six of these gate driver circuits and corresponding command signals are needed to drive a three-phase inverter. To minimize these requirements and improve the flexibility and capability of the gate driver circuit a second circuit was developed, called here multiple gate driver circuit 300 shown in FIG. 3.

Figure 3:
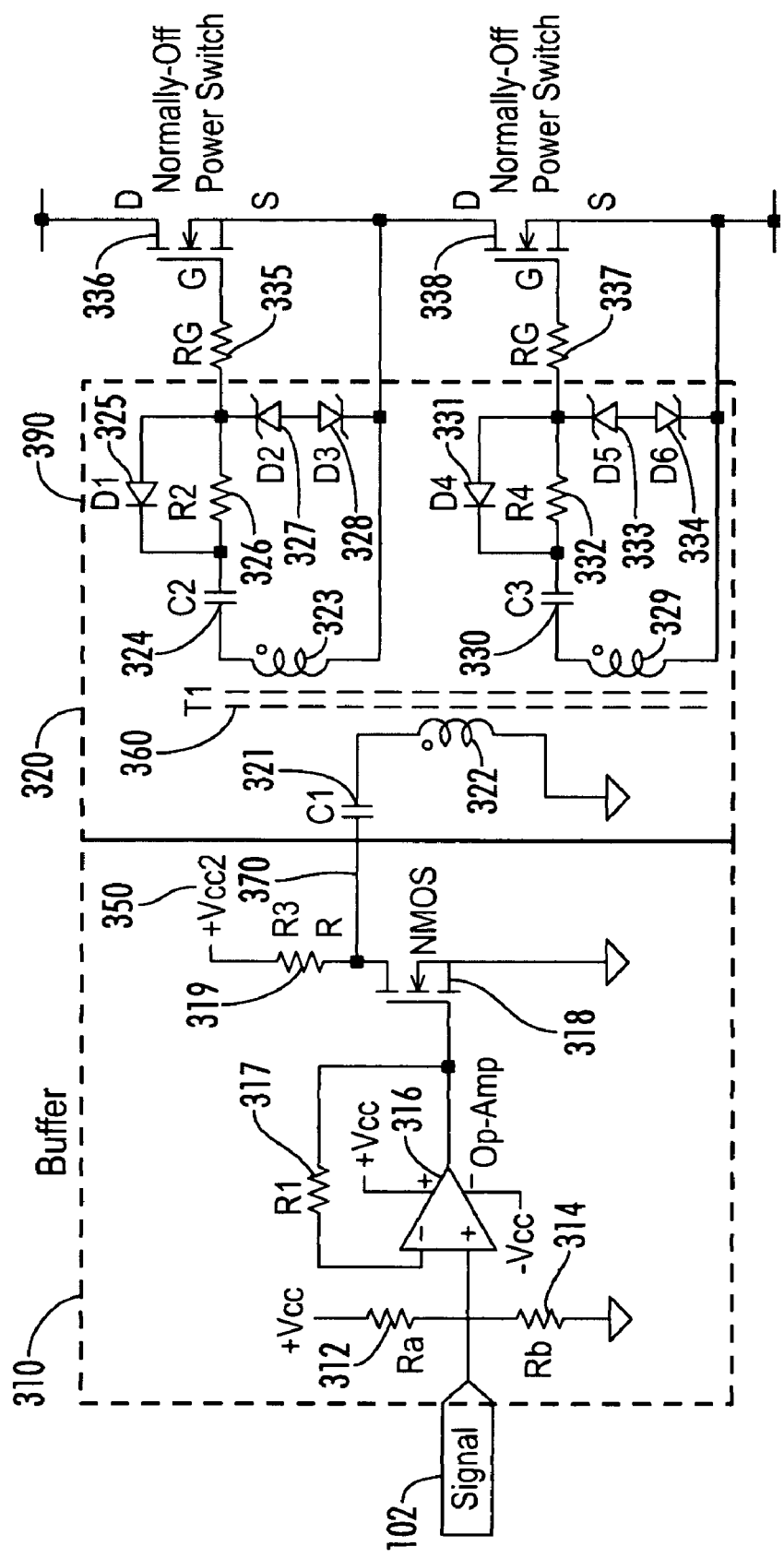
FIG. 3 is a circuit schematic for an improved high temperature gate driver with buffer and isolation.

FIG. 3 shows the multiple drive circuit 300 schematic. This multiple drive circuit 300 also contains two blocks, namely a buffer block 310 and isolation block 320. When compared with the previous gate driver, this circuit has several important differences.

Buffer Block 310. The signal 102 coming from the controller is similarly being buffered by a voltage divider with second resistor 312, and second resistor 314 to feed an op-amp 317 configured as a buffer. But instead of connecting a second op-amp to increase current capability, an NMOS transistor 318 with a pull-up resistor 319 is used. This configuration provides greater current drive. In addition, the output voltage provided by the buffer block is not limited to +/−5.0V (or a value in between) like in Gate Driver One. Now the buffer block output voltage goes from 0V to +VCC2 350 which is an external voltage adjustable up to +60V.

Figure 4:
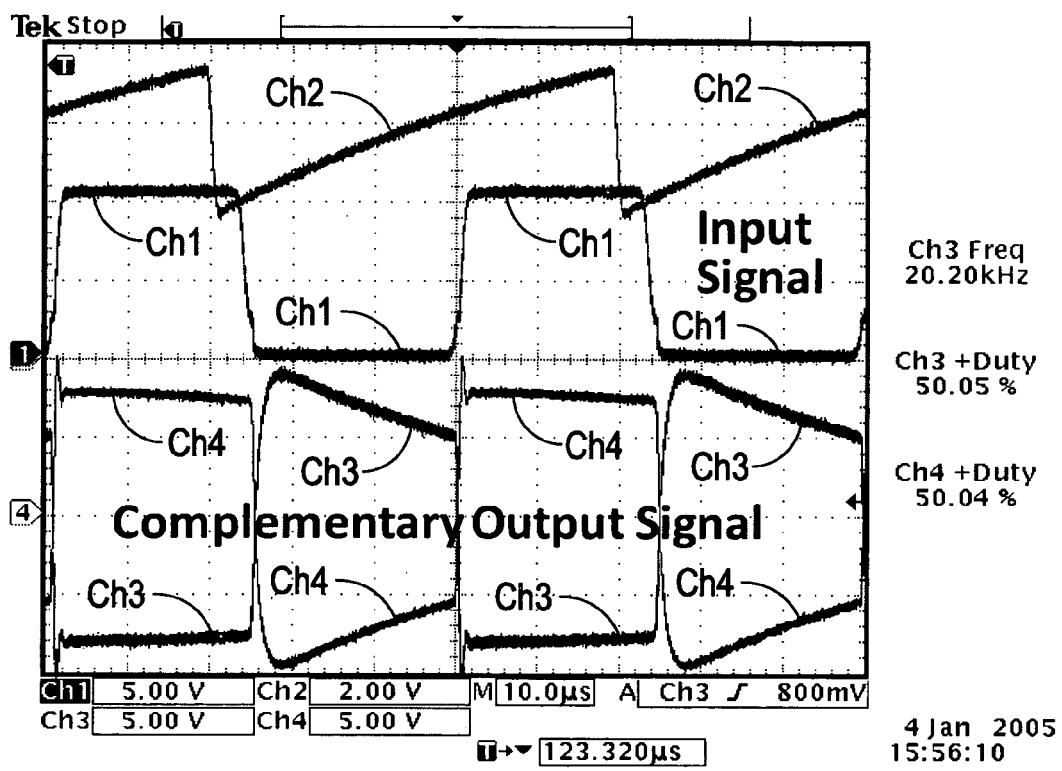
FIG. 4 is a graphic view of the isolation stage signals from the circuit of FIG. 3.
Figure 5:
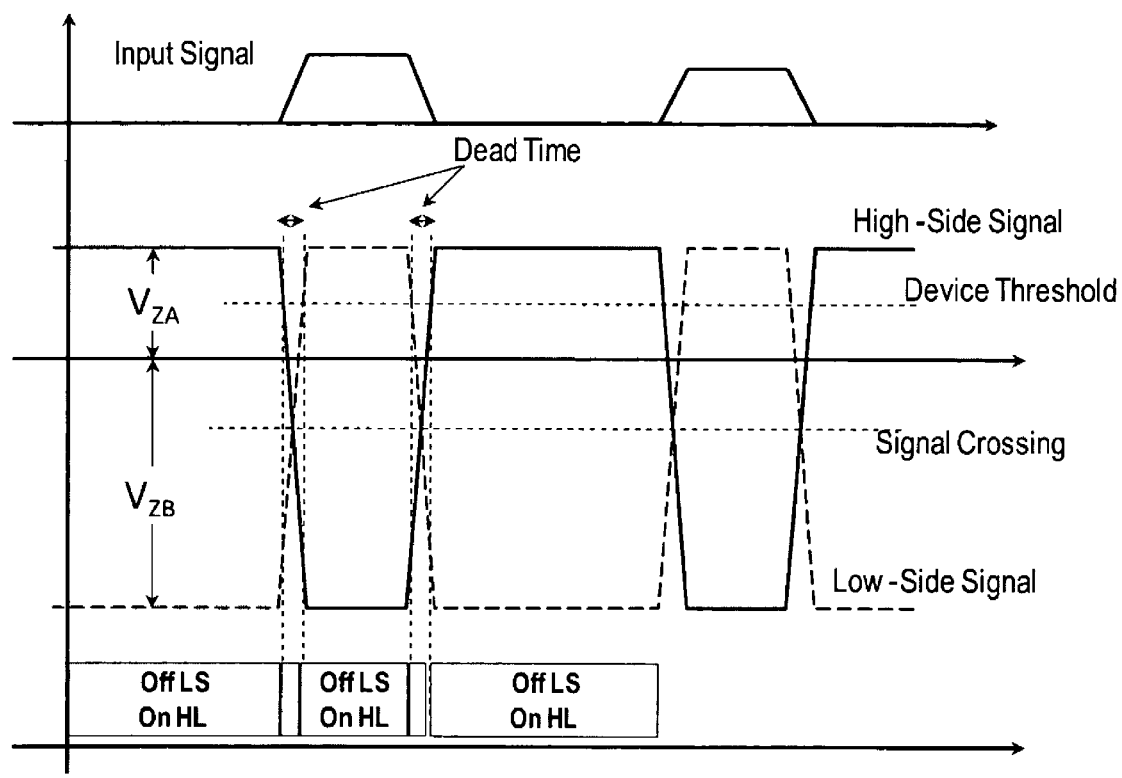
FIG. 5 is a graphic view of the theoretical complementary signal generation showing dead time.

Isolation Block 320. Just as in the previous circuit, the isolation is still provided by a pulse transformer, T1 360 with a primary winding 322, but in this case two secondary windings 323, 329 are present. Note that the polarity of the secondary windings 323, 329 are opposite from each other. This is used to create two complementary signals with one for the high side switch 336 and the other one for the low-side switch 338 out of a single input. In addition, several capacitors C1 321, C2 324 and C3 330 have been added. These capacitors 321, 324, 330 allow the pulse transformer 360 to operate under duty cycles different from 50%. In theory, any duty cycle is possible up to the theoretical limits of 0 and 100%. Capacitors C1 321 filters out the dc components of the buffered signal 370. FIG. 4 shows the transformer's input signal with a dc value and the two complementary output secondary signals with no dc value. Capacitors C2 324 and C3 330 are used to reconstruct the dc components in the secondary side without affecting the transformer 360. The reconstruction is done via diodes D2 327, D3 328, D5 333 and D6 334. As discussed above, the addition of the decoupling capacitors allowed the pulse transformer 360 to deliver control signals with duty cycles different from 50%. Also, the isolation stage 320 was modified to generate two complementary signals out of one input. However, for this signal to be useful when driving a half bridge leg, "dead time" needs to be added. Dead time is the time between the on/off transition of the high-side devices and the off/on transition of the load-side devices in which both devices are off. This time is needed to prevent catastrophic failure of the half-bridge leg. FIG. 5 shows how the dead time is generated using the drive circuit in FIG. 3. The figure and corresponding explanation below is given for normally-off devices; however, a reciprocal case can be described for normally-on devices. Hence this driver can be used for both devices simply by adjusting the value of some components. The isolation block 320 has been modified to include two Zener diodes, 327 D2 and 328 D3 for the highside and 333 D5 and 334 D6 for the low side in FIG. 3. These diodes 327, 328, and 333, 334 will shift the signal up or down depending of the relative value of the Zener diodes as depicted in FIG. 5 VZA and VZB with generic Zener diodes DZA and DZB. The value of these Zener diodes also control the dead time between the falling/rising edge of the low-side signal and the rising/falling edge of the high-side signal. As shown in FIG. 5, the falling/rising edge of the low-side signal will cross the rising/fall edge of the high-side signal in the middle point between the maximum and minimum value, e.g., if maximum value is +15V and minimum value is −20V, the signal will cross at (15V−20V)/2=−2.5V. Therefore, for normally-on power devices i.e., VTH~7V as shown in FIG. 5, there is a time in which both devices are off. A change in Zener values will generate a change in dead time. FIG. 6 shows a scope capture presenting the operation of this gate driver. The figure shows that different duty cycles are possible and that the signals have a small dead time. The figure also shows that the maximum and minimum values of the signals set in this description are +15V and −20V but are not constant for all duty cycles. Notice in the figures the actual waveform does not reach the theoretical waveform as described in FIG. 5. To fix this, several modifications were then included in the circuit in order to increase the current delivering capabilities.

Figure 7:
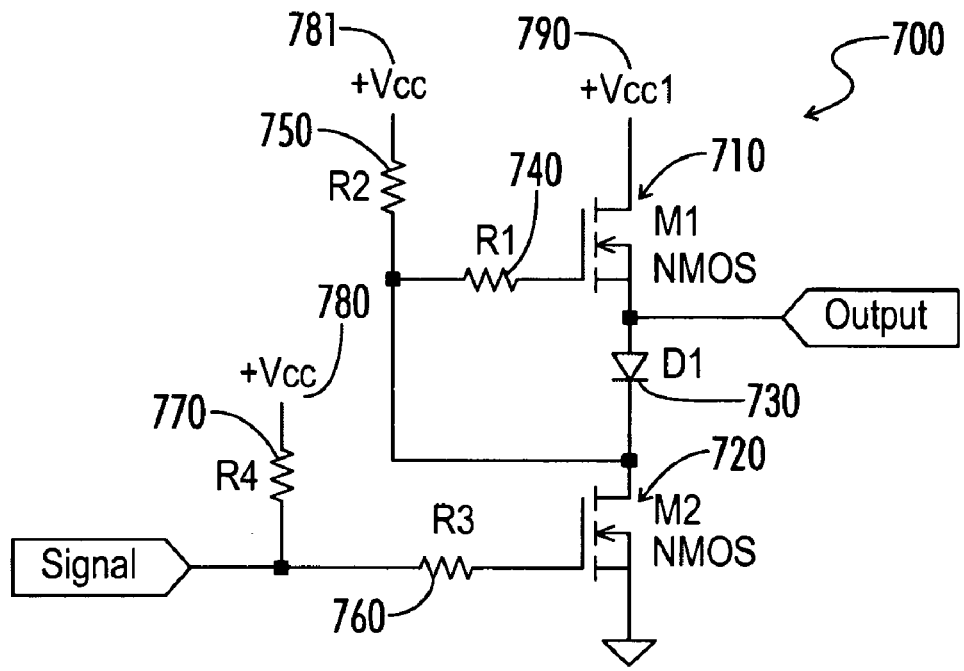
FIG. 7 is a circuit schematic for an improved high temperature buffer circuit.

FIG. 7 shows a more powerful configuration of a buffer block 700. In the buffer block, the previous circuit's NMOS transistor with a pull-up resistor that was used to drive the transformer was replaced. The maximum current that the original buffer configuration was able to deliver was limited by the pull-up resistors. A resistor with a large value limits the maximum current that can be delivered; however, a small resistor value greatly increases the power loss. The normal approach to solve this is to use a totem-poll configuration which requires NMOS and PMOS transistor types. Unfortunately, there was no high temperature silicon carbide HTSOI PMOS type transistor available at the time of development. The circuit in FIG. 7 shows a totem-poll circuit that was made using two NMOS devices 710, 720 so it can be implemented using high temperature parts. To implement this circuit 700, two complementary signals with dead time must be generated in order to control the top and bottom N-type devices much like in the case described in FIG. 5. This is done by using a diode connection D1 730 which ensures that M1 710 is off when M2 720 is on. When M2 720 is on, D1 730 is on thus providing a negative voltage from the gate to the source of M1 710 (Vgs M1). Conversely, when M2 720 is off, D1 730 stops conducting, and M1 710 turns on. Resistor R1 720 is the gate resistor for M1 710 and is used to limit the turn off current of M1 710. R2 750 keeps Vcc 780 from short-circuiting when M2 720 is on since the gate of M1 710 is pulled low when M2 720 is on. Resistor R4 770 is a pull up resistor that provides a more stable microcontroller output signal and R3 760 is the gate resistor of M2 720 that is used to limit the gate current of M2 720. Vcc 780, 781, and Vcc1 790 can be independent or the same voltage. Independent voltages increase complexity, but allow for low power loss.

Figure 8:
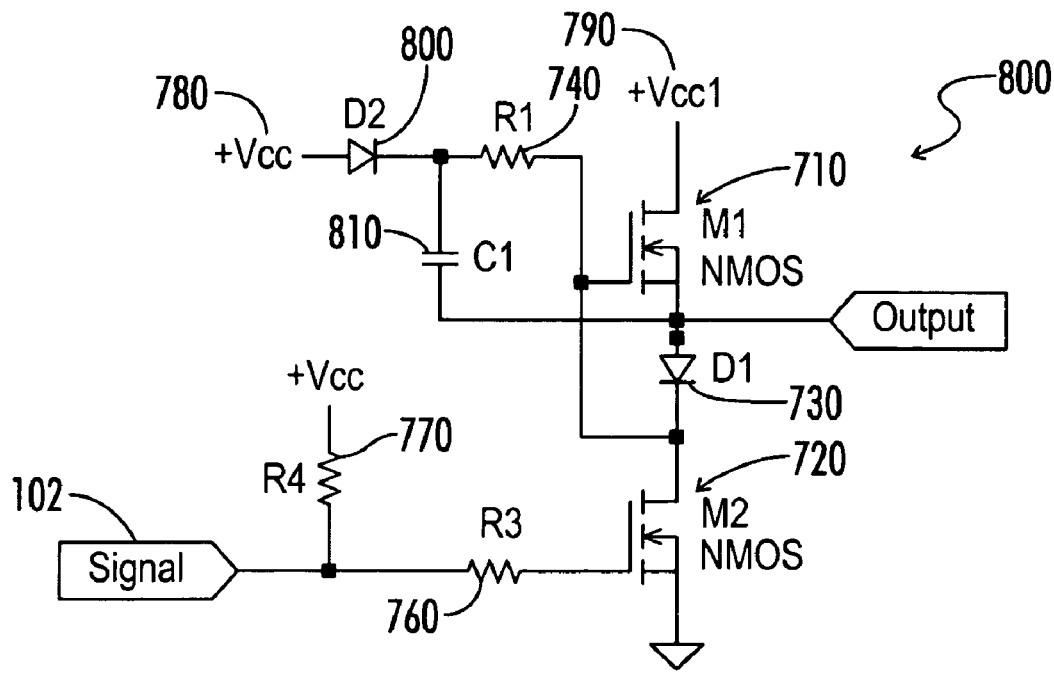
FIG. 8 is a circuit schematic for a low-loss high temperature buffer circuit.

FIG. 8 shows how FIG. 7 can be modified to minimize power consumption. The principle of operation for the low loss buffer circuit 800 is similar to the one described above.

A high-level input signal will turn on M2 720, which will pull down R1 740. As the gate to source voltage of M1 710 falls, M1 710 turns off and D1 730 becomes forward biased. A current path is established through D2 800, C1 810, D1 730, and M2 720, which charges the bootstrap capacitor C1 810. Additionally, the source of M1 710 is pulled down through D1 730 and M2 720.

A low-level input signal will turn off M2 720 and allow R1 740 to pull up the gate of M1 710. As the gate rises, D1 730 becomes reversed biased and M1 710 turns on. The source of M1 710 is pulled up which reverse biases D2 800. The gate-to-source voltage of M1 710 is maintained throughout the switching period by the bootstrap capacitor C1 810. This circuit solves a few issues encountered when implementing the circuit in FIG. 7. First, the addition of C1 810 and D2 800 provide a lower-impedance supply for M1 710 which delivers a more stable voltage and the design is less susceptible to noise. Second, the addition of these components provide greater flexibility to the values adopted for supplies Vcc 780 and Vcc1 790 which reduces the power loss. The minimum value of Vcc 780 should be the same value as Vcc1 790; however, higher values are needed, such as a few Volts, to minimize the power loss in M1 710. Unfortunately, Vcc 780 is connected to ground via resistor R1 740 when M2 720 turns on. However, in FIG. 8 the value restriction for Vcc 780 is eliminated because Vcc 780 can be equal to or greater that Vcc1 790. Vcc 780 is always lower than 10V while Vcc1 790 may reach 50V. Therefore, this new buffer block allows for output signals up to 50 V as limited by the breakdown voltage of the HTMOS devices 710, 720, 800, 730 while minimizing the loss across R1 740.

Figure 9:
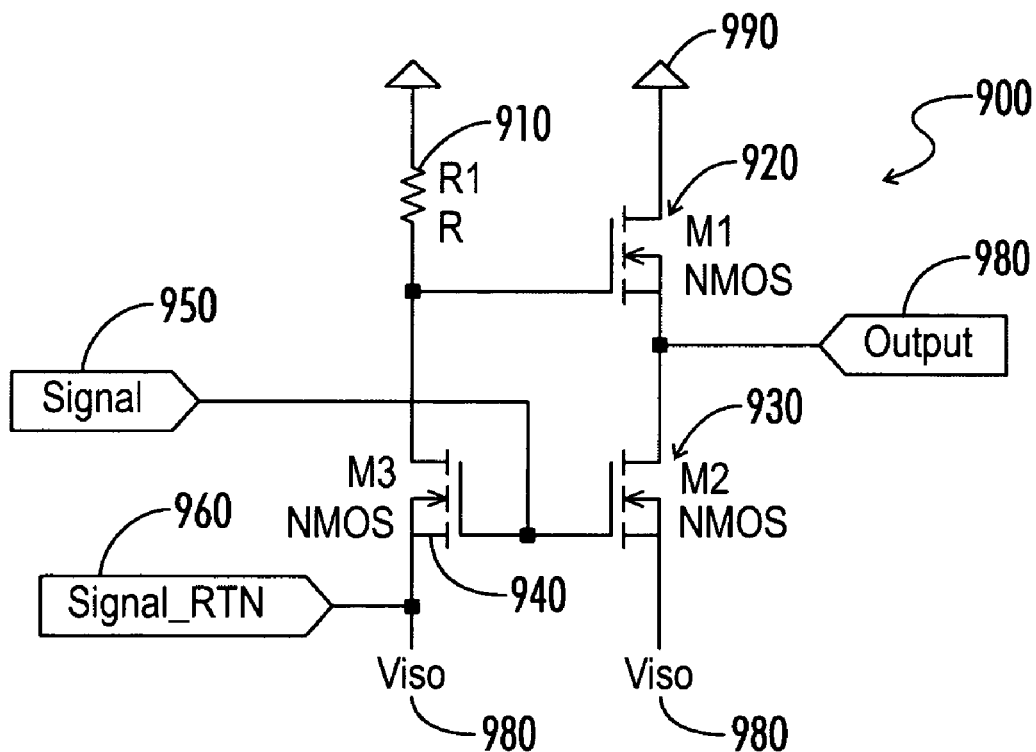
FIG. 9 is a schematic view of a high temperature non-linear amplifier.

FIG. 9 shows a different improvement that provides a drive block 900 that includes a buffer block after the isolation transformer to help deliver more current to the gate of the power devices. The circuit in FIG. 9 shows a non-linear amplifier for normally-on devices that is formed by three NMOS transistors. Transistors M1 920 and M2 930 form a NMOS totem-poll; M2 930 is controlled by the reconstructed control signal while M1 920 is controlled by a complementary version of this signal created by M3 940 and R1 910, which is configured as an inverter circuit. An additional resistor may be added between R1 910 and the gate of M1 920 for additional reliability. The circuit 900 is powered by the first and second terminals of an isolated supply, Viso 980, 990. This circuit 900 can also be used to drive normally-off devices by changing the connection of the power supply, Viso 980, 990. FIG. 9 can also be used as non-linear amplifier to boost the current capability of the gate drive circuits.

Figure 10:
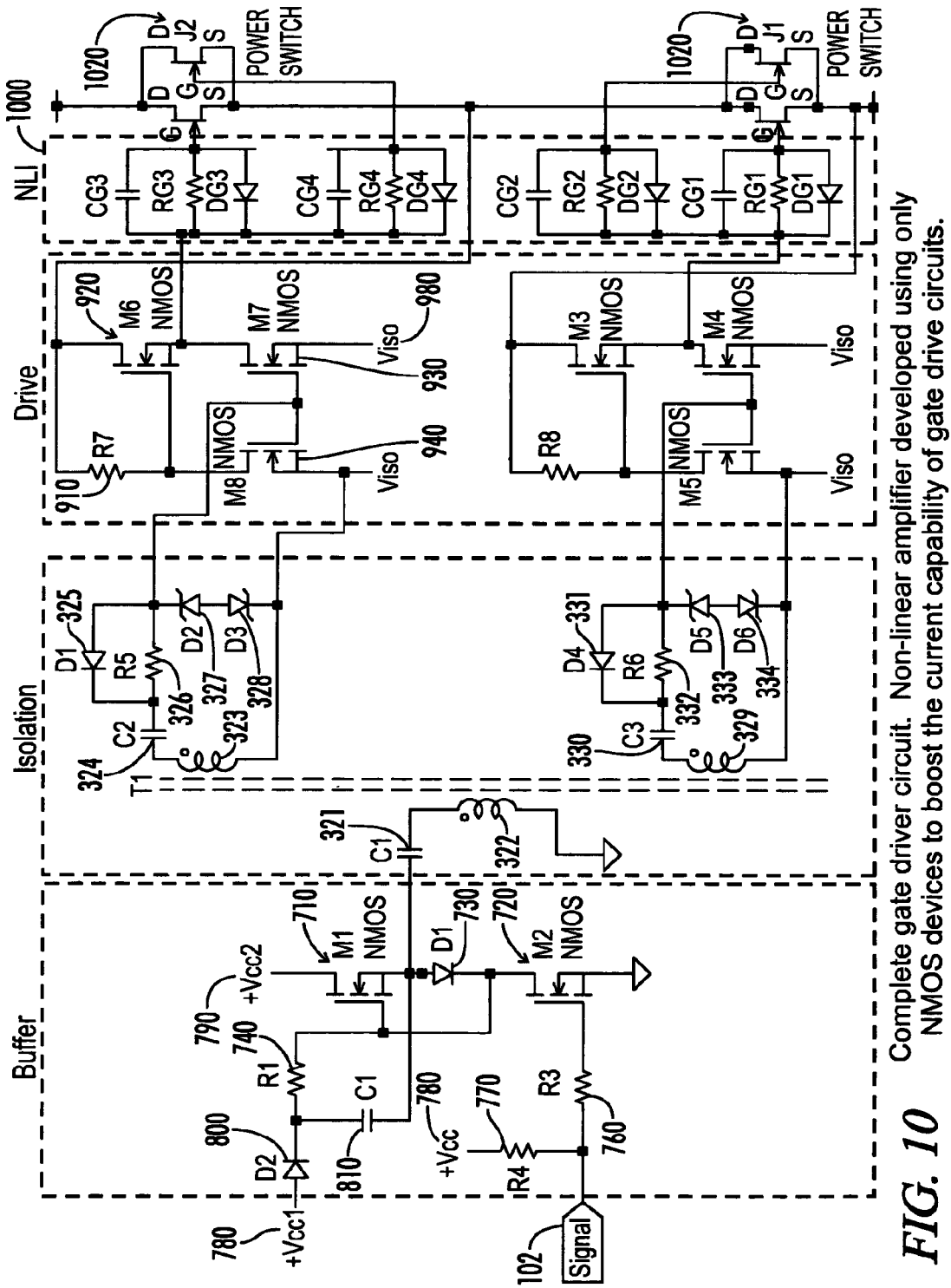
FIG. 10 is a schematic view of a complete high-temperature, buffered, isolated, non-linear gate drive circuit.

FIG. 10 shows the combined circuit. As further noted in FIG. 10, the classical gate resistor has been replaced with a non-linear impedance network NLI 1000. This non-linear impedance network 1000 allows for the driving of the SiC VJETS power switches J1 1010, J2 1020 down to their breakdown point without risking device failure. SiC VJFET power switches have a threshold voltage value that is close to their maximum gate voltage value allowing little room between "on" and "off" voltages. This makes the driving of SiC VJFET power switches difficult since there is little noise immunity. This problem is aggravated when connecting several devices in parallel, due to parameter variation of the threshold voltage and the maximum gate voltage. The addition of this non-linear impedance network NLI 1000 allows for the safe and independent control of each transistor J1 1010, J2 1020 to its maximum gate voltage. This boosts the noise immunity of the gate driver 100. This non-linear impedance network NLI 1000 has been suggested, but we are not aware of an actual circuit design.

Note that a complete gate driver requires an isolated power supply block 140. Any appropriate isolated power supplies can provide that function.

For the high temperature implementation of the entire gate driver discussed above, we have used commercially available components, for the most part, that have been tested beyond their rated temperature and deemed adequate for this application. NMOS and opamp and/or analog switches used were all HTSOI components.

FIGS. 11 through 26 show another design that teaches a high temperature on-off multiple short pulse command gate drive circuit 1100, hereinafter multiple short pulse drive circuit 1100. The basic principle of operation of this gate driver 1100 can be understood from the buffered pulse and the inverted pulse generated in the block diagram of FIG. 11 and shown in the pulse schematic of FIG. 16. The circuit "conditions" or "encodes" the original PWM signal 1102 into two short pulses using opposing pulse generators 1108, 1110 with one representing a turn-on event and the other representing a turn-off event. As shown in FIG. 16 the width of the pulses 1604, 1606 are much smaller than the width of the original PWM signal 1102. Therefore, these pulses 1604, 1606 have a much smaller Volt-second value than the original signal 1102. The reduction of the signal Volt-second value allows for the reduction of the physical size of the pulse transformer 1114.

In high temperature environments the reduction of the pulse transformer 1114 size is key due to several reasons. First, as temperature increases the performance of magnetic material used in the core of the pulse transformer decreases. This implies that for high temperature operation, pulse transformer cores must be under-rated or over-sized. This not only increases the losses on the pulse transformer core, which are proportional to core size, but also increase the number of turns needed. Larger number of turns generally means greater inter-winding capacitance, which translates into higher capacitance across the isolation barrier diminishing the effectiveness of the isolation barrier under high dV/dt events. This gate driver 1100 uses a pulse transformer 1114 to isolate command pulses that are reconstructed and used to drive an isolated buffer. This isolated buffer or non-linear amplifier 1118 generates the proper signal to turn the power devices on and off. The fact that only command pulses are used as opposed to the complete command signals allows for the development of more compact isolation pulse transformers 1112. These transformers 1112 have much smaller parasitic capacitance across the isolation barrier allowing for greater noise immunity, i.e., dV/dt. In this design, the level shifter MOSFETs are replaced with an isolation transformer since the desired isolation voltage is much too large for current MOSFET technology. Now that the basic operation and advantages are understood, the detail of the invention is presented beginning with FIG. 11.

Figure 11:
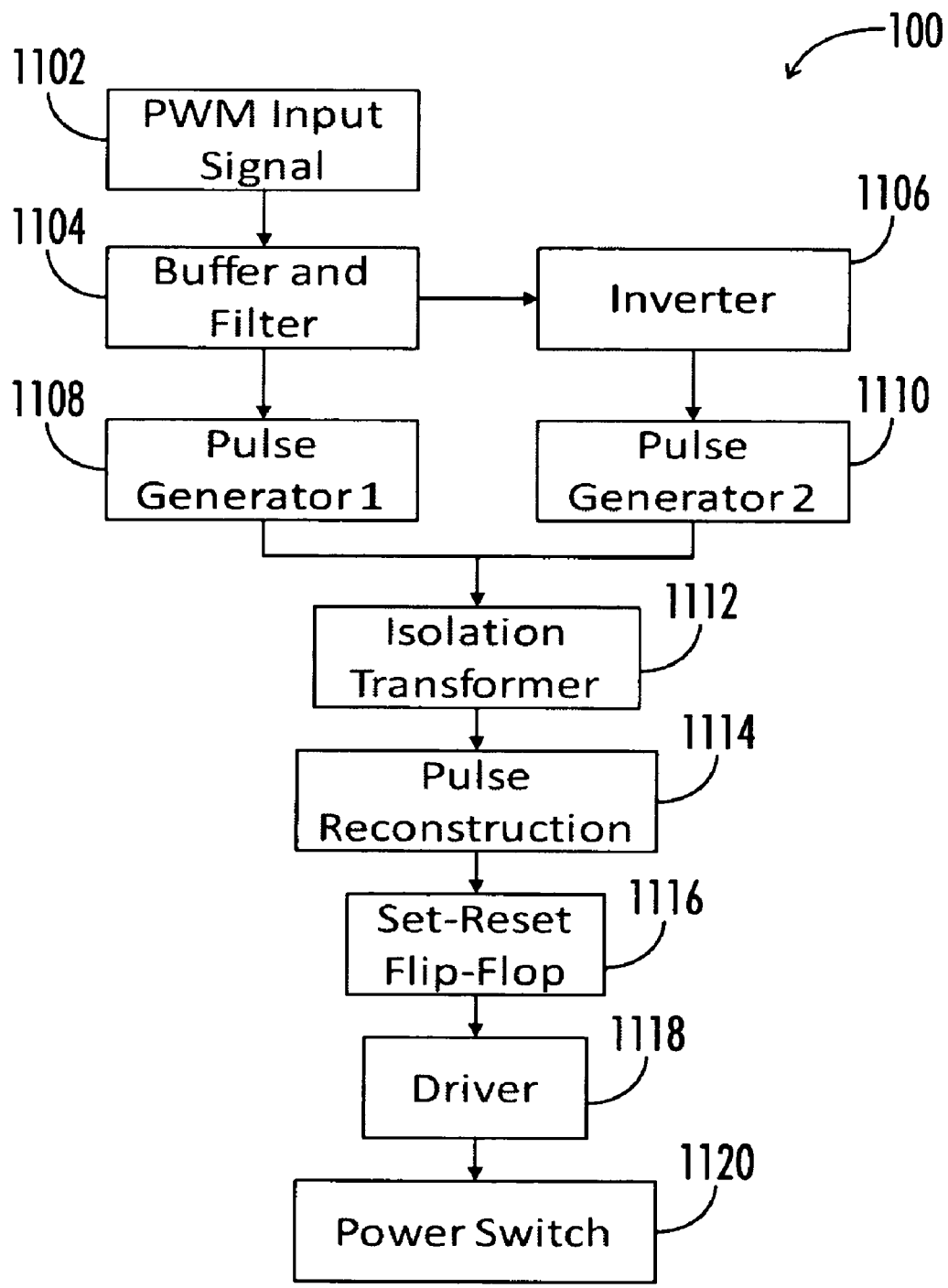
FIG. 11 is a graphic representation of the driving principle for the set-reset gate drive circuit.

FIG. 11 shows a block-level diagram of the multiple short pulse drive circuit 1100. The top block is the PWM input signal 1102, which is generated from the PWM controller or other microcontroller. The input signal 1102 is buffered and filtered 1104 to increase noise immunity. The output of the buffer 1104 is sent to a pulse generator 1108 and an inverter 1106, which in turn is connected to another pulse generator 1110. The purpose of the pulse generators 1108, 1110 is to encode the transitions of the PWM signal into very short pulses shown in FIG. 16. For example, pulse generator 1108 creates a short pulse on the falling edge of the PWM signal and inverted pulse generator 1110 creates a pulse on the rising edge. The signals from the pulse generators 1108, 1110 are then combined and transmitted across the isolation transformer 1112. The short duration of the generated pulses means that the transformer 112 will see a very small volt-second product. This allows for a reduction in the number of turns necessary to construct the transformer 1112 windings, thus reducing interwinding capacitance. Additionally, this design is compatible with coreless planar magnetics, which can significantly reduce the size of the gate driver 1100. The output of the transformer 1112 is then sent through a pulse reconstruction circuitry 1114, which separates the single transformer signal into the two signals created by the pulse generators 1108, 1110. These two pulses control the set and reset inputs of a set-reset flip-flop 1116. The output of the flip-flop 1116 is a recreation of the original PWM input signal 1102. The flip-flop 1116 output then controls the driver 1118 stage, which provides sufficient voltage and current levels to drive the power switch 1120.

Figure 12:
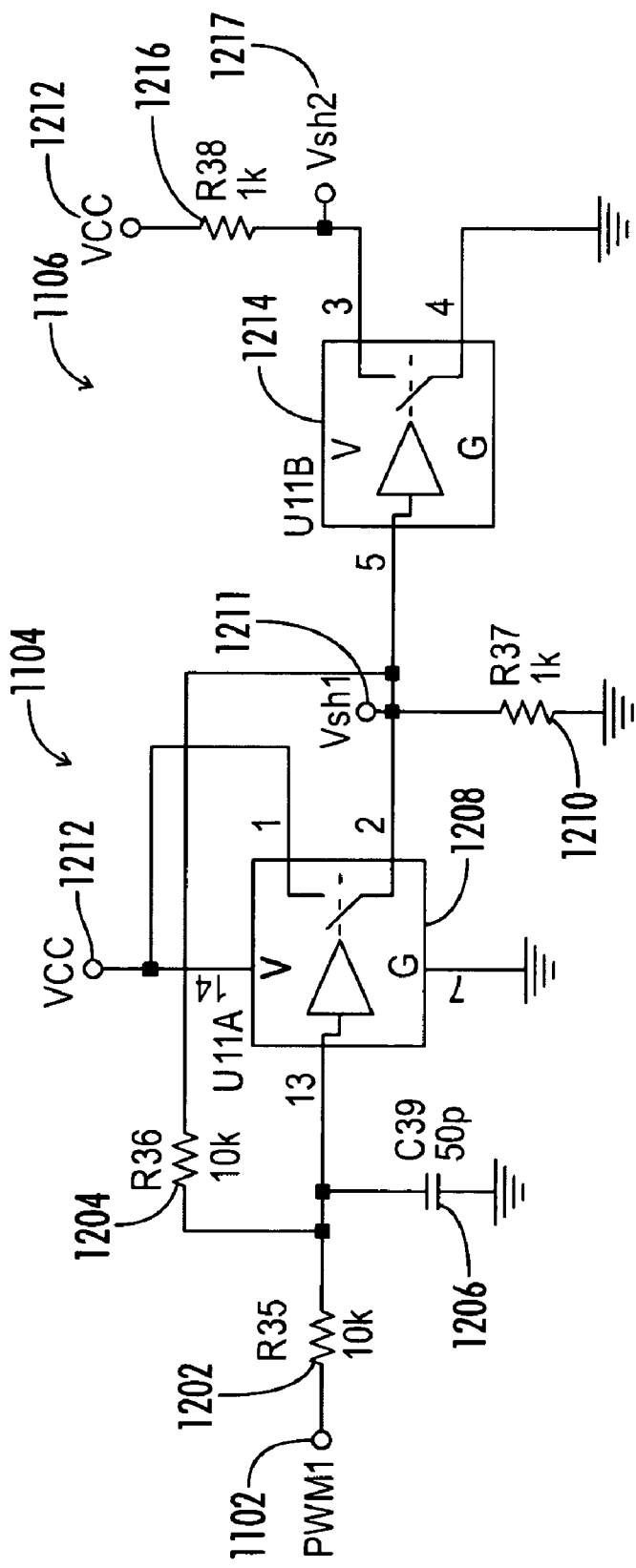
FIG. 12 is a circuit schematic for the buffer and inverter blocks.

FIG. 12 shows the implementation of the buffer/filter 1104 and inverter 1106 stages using HTSOI analog switches 1208, 1214 from HONEYWELL. The buffer/filter is formed around switch U11A 1208 and the inverter is formed around U11B 1214. Resistors R35 1202 and R36 1204 provide hysteresis to the buffer, i.e. Schmitt trigger operation, and capacitor C39 1206 filters the input of the analog switch in order to reduce the effects of switching noise. Resistor R37 1210 is simply a pull-down resistor for the output since the output cannot be pulled low actively with the analog switch 1214. Likewise, R38 1216 is a pull-up resistor for the inverter 1106. This implementation is new in the use of analog switches 1208, 1214.

Figure 13:
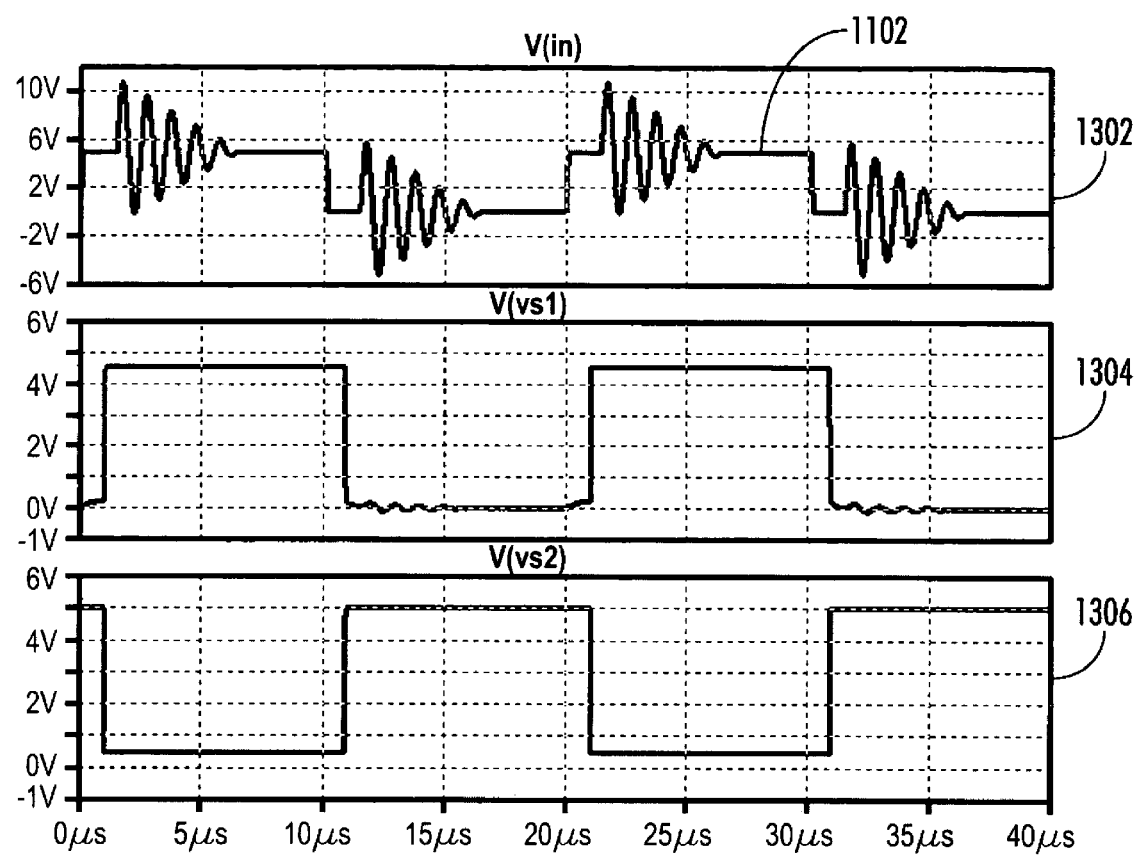
FIG. 13 is the waveforms for the buffer and inverter for FIG. 12.

FIG. 13 shows the waveforms associated with the buffer/filter 1104 and inverter 1106. The top waveform 13 is the input pulse width modulation signal 1102 with switching noise shown as oscillation. The middle waveform 1304 is the output 1211 of the buffer/filter. As can be seen, this output is a recreation of the PWM signal with a slight time delay where the noise level oscillation is greatly reduced. The bottom waveform 1306 shows the output 1217 of the inverter.

The high temperature versions of pulse generators 110, and 110 poses a unique problem not encountered in normal temperature environments. In a standard low-temperature operating environment, the pulse generators 1108, 1110 could have been made with a few discrete transistors; however, HTSOI devices that can switch fast enough and provide enough current to the isolation transformer 1112 are not available. Therefore, a new solution had to be invented. Simple HTSOI 555 timers from CISSOID were used since they can provide both the speed and current level required. The disadvantage to this approach is that the timers require many additional components due to their triggering requirements.

Figure 14:
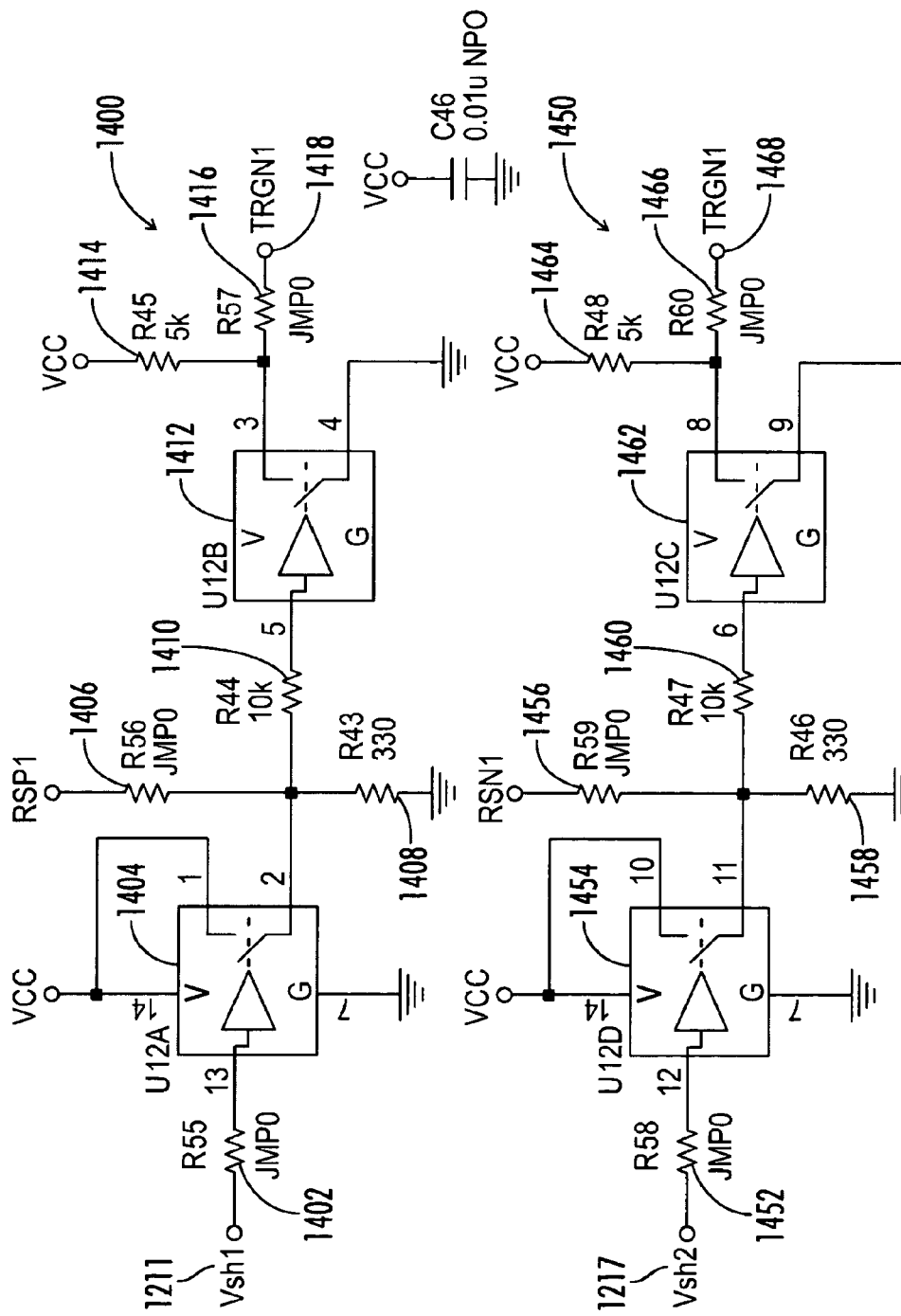
FIG. 14 is a circuit schematic for analog triggers for timers.
Figure 15:
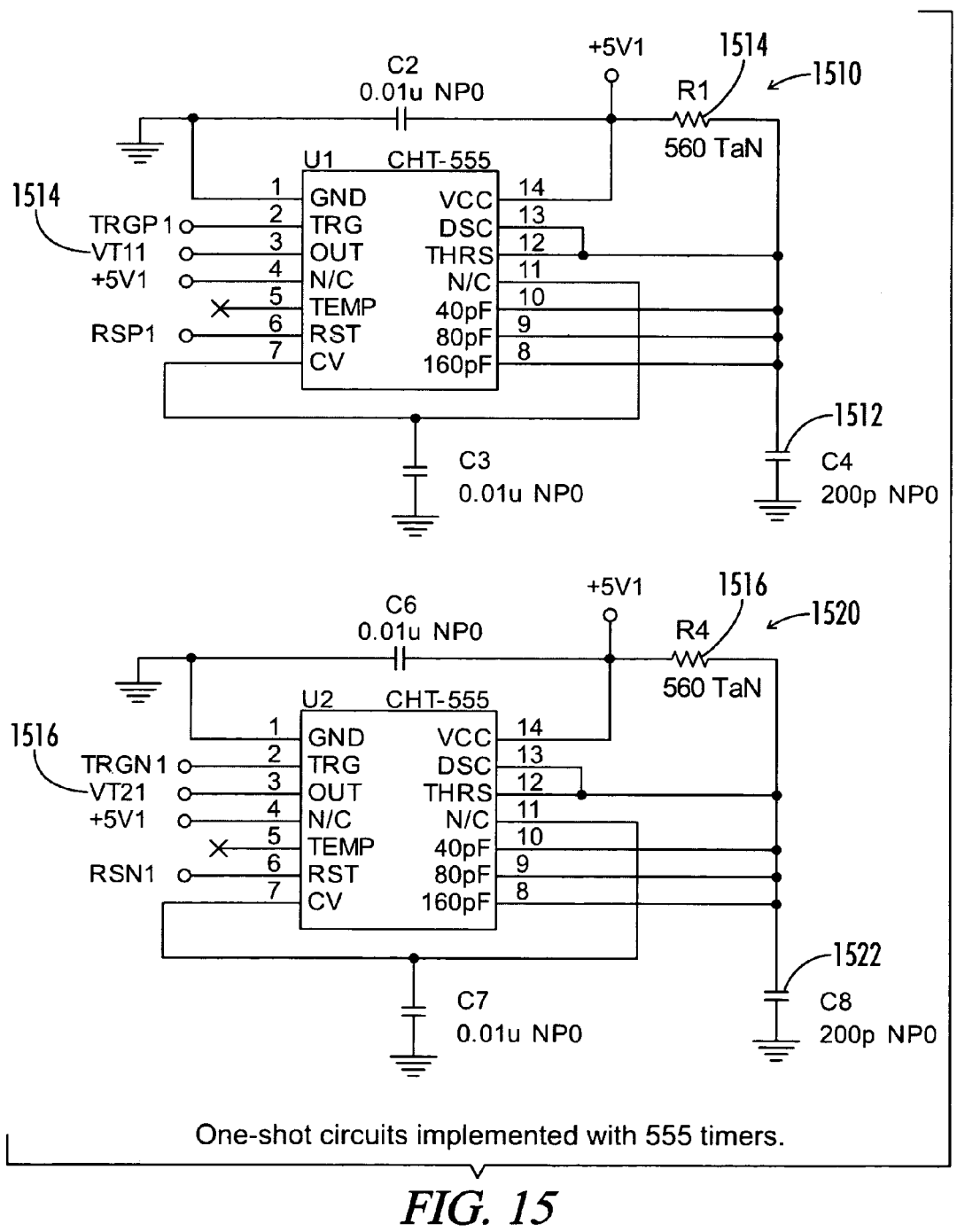
FIG. 15 is a circuit schematic for the pulse generators implemented with 555 timers.
Figure 16:
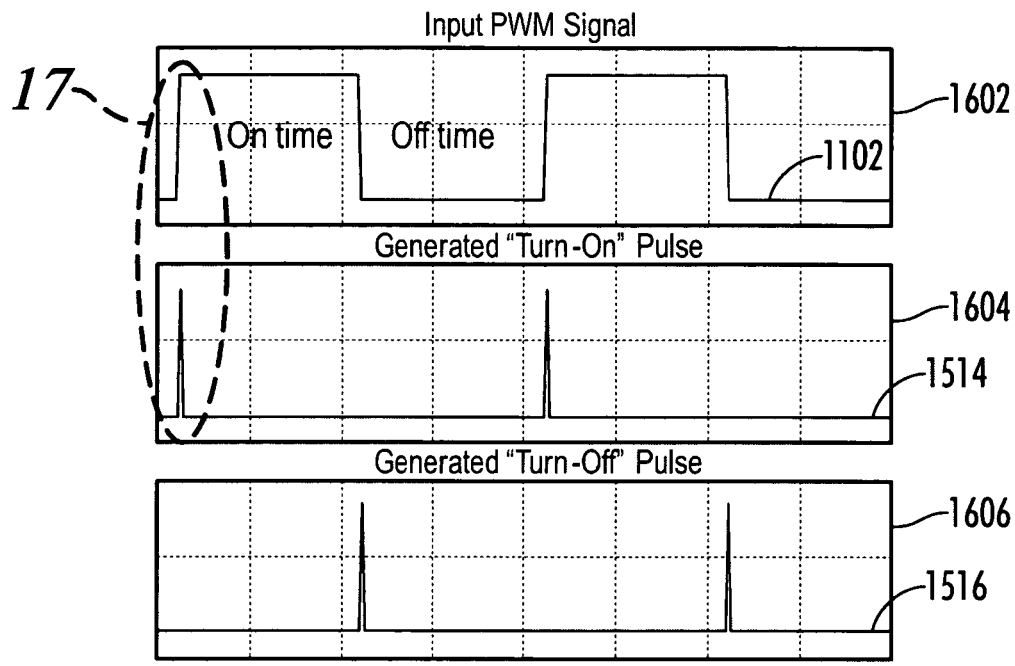
FIG. 16 is the waveforms for the operating principle of the set-rest gate driver.

FIGS. 14 and 15 show the pulse generators 1108, 1110. The pulse generators 1108, 1110 are each composed of two major sections: the trigger and the one shot. The trigger circuitry 1400, 1450, shown in FIG. 14, is implemented with HTSOI analog switches. The inputs 1211, 1217 to this block are the outputs from the buffer/filter and inverter stages. Buffers U12A 1404 and U12D 1454 are the first stages of the triggers 1400, 1450. The outputs of this stage are connected to inverters U12B 1412 and U12C 1462 through resistors R44 1410 and R47 1460. These resistors 1410, 1460 in combination with the input capacitance of the inverters U12B 1412 and U12C 1462, provide a slight time delay between the output of the buffer 1211 and the output of the inverter 1217. This produces two signals slightly delayed from the buffer/filter output 1211 and two signals slightly delayed from the inverter output of U12B 1217. These signals are used to trigger the 555 timers and subsequently produce the desired pulse outputs 1514, 1516. This triggering method has not been seen previously. The actual 555 timers 1510, 1520 are configured as one-shots, as shown in FIG. 15 with outputs 1514, 1516. Once the timers are triggered, the output goes high and the timing capacitors C4 1512 and C8 1522 charge through resistors R1 1514 and R4 1516. Once the voltage across the capacitors 1512, 1522 reach a predefined level, the output goes low and the capacitors 1512, 1522 are discharged. This is a very common use of the 555 timer and is usually displayed on the device's datasheet.

Figure 17:
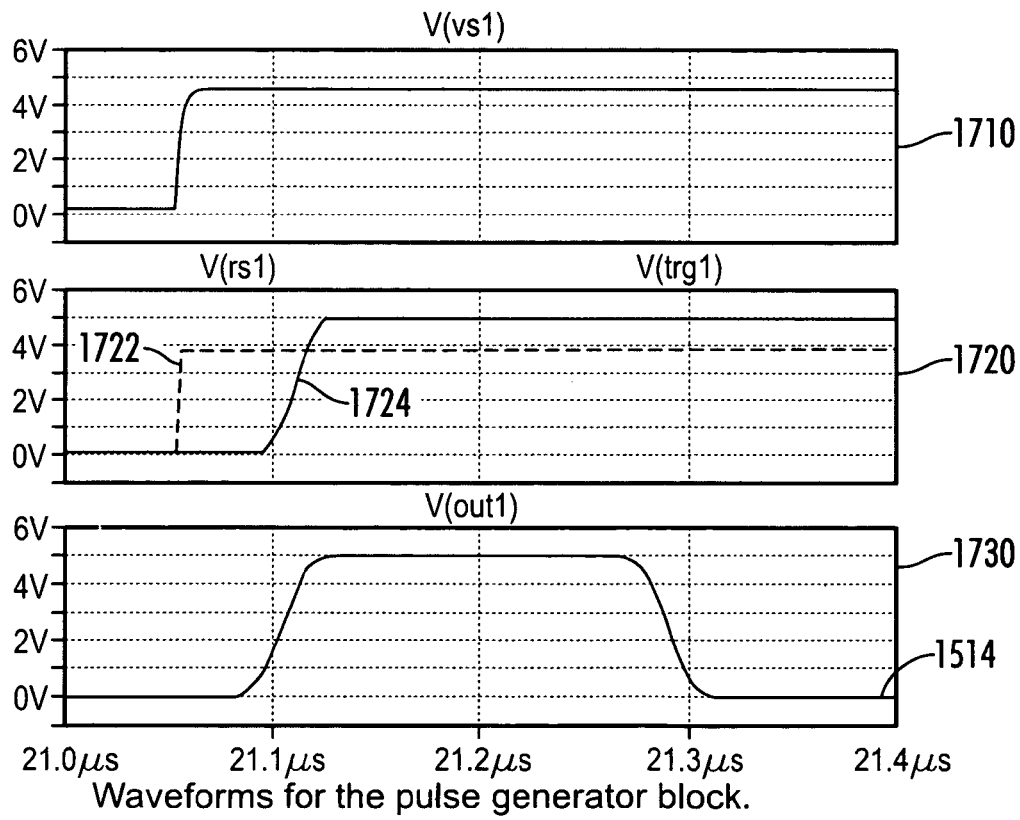
FIG. 17 is the exploded view of one of the waveform pulses in FIG. 16.

FIG. 16 shows the waveforms associated with the pulse generator circuitry. FIG. 16 shows how the pulses generated 1604, 1606 at the output terminals 1514, 1516 are very small in relation to the incoming signal 1102. FIG. 17 provides detail of this miniature pulse generation. In FIG. 17, the top waveform 1710 is the output of the buffer/filter. The middle waveforms 1720 are the reset 1722 and trigger 1724 signals for the non-inverted pulse generators 1108. The bottom waveform 1730 is the output of the pulse generator 1108. Once the PWM signal from buffer/filter output 1710 goes high, the reset 1722 of the timer is deactivated by going high. The trigger level 1724 remains low for a short period of time due to the delay imposed by the trigger circuitry 1400. In this amount of time, the timer 1510 is triggered and initiates its one-shot operation. The trigger 1400 then deactivates and goes high which allows the timer 1510 to complete the one-shot operation. The amount of time used to trigger the timer must be shorter than the width of the generated pulse since the timer will produce additional pulses if the trigger is still activated. A similar operation occurs by the inverted circuitry by the falling edge of the input PWM signal 1102.

Figure 18:
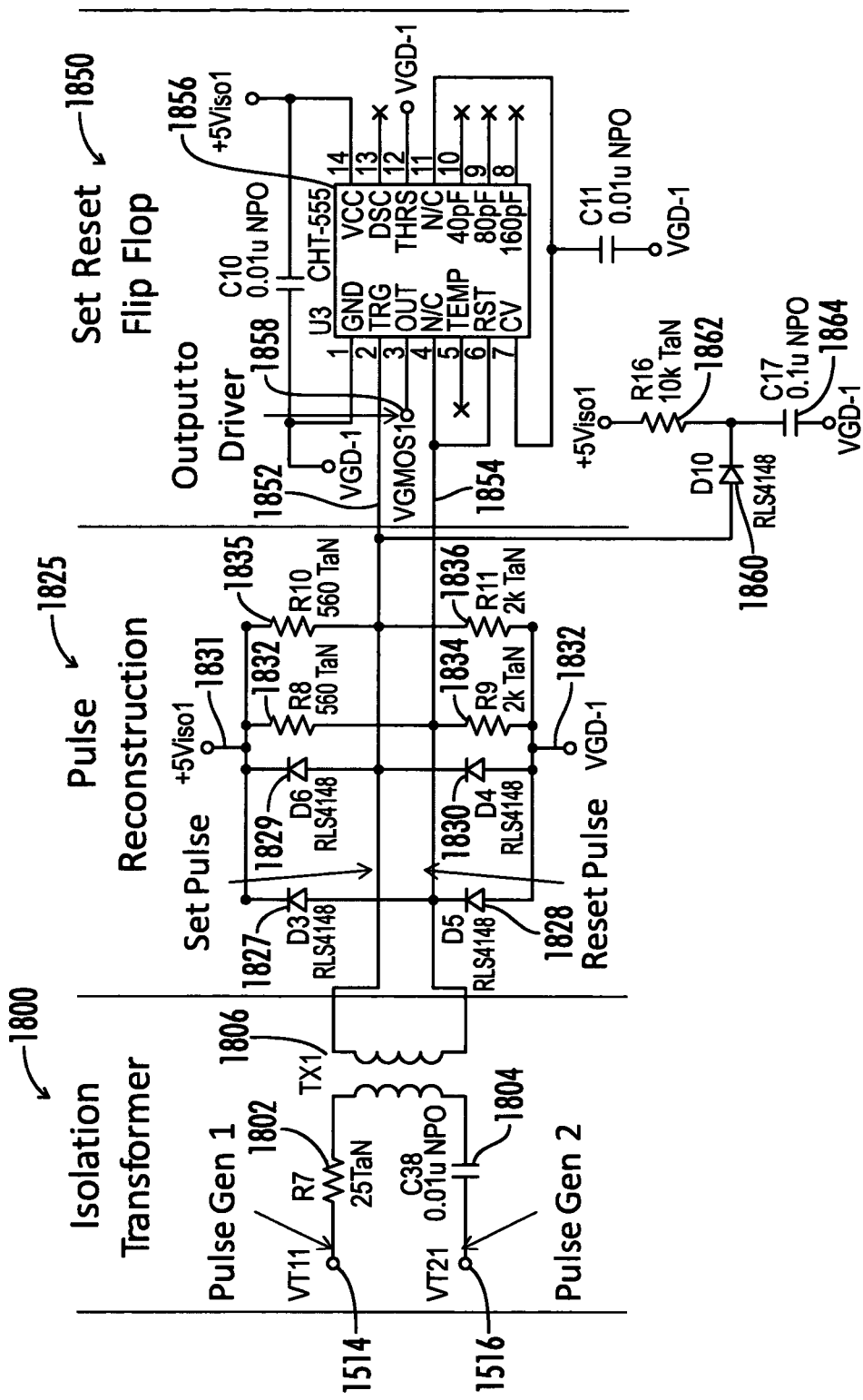
FIG. 18 is the circuit schematic for the isolation tx, pulse reconstruction and set-reset blocks.
Figure 20:
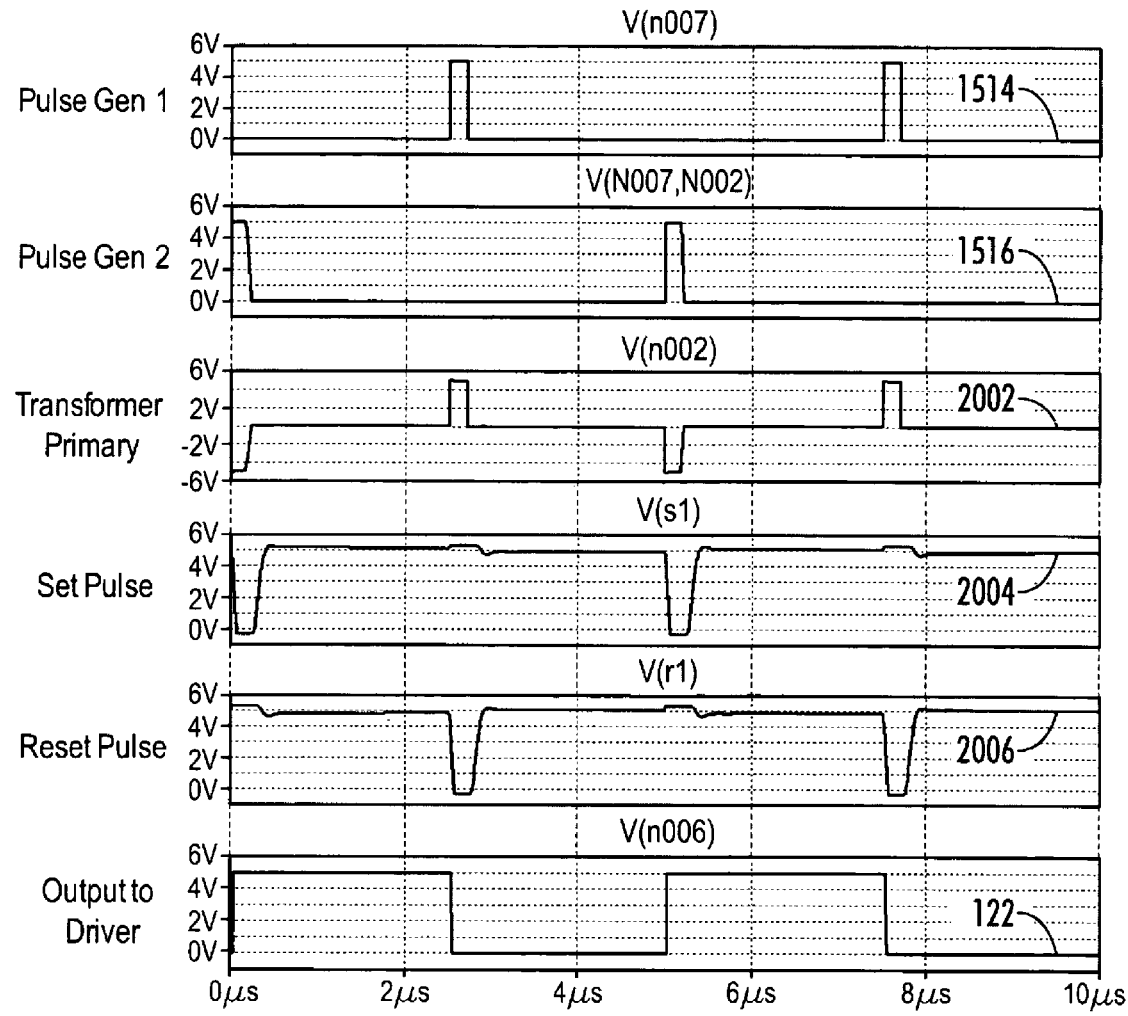
FIG. 20 is the waveforms for the pulse generators, transformer, and regeneration blocks.
Figure 21:
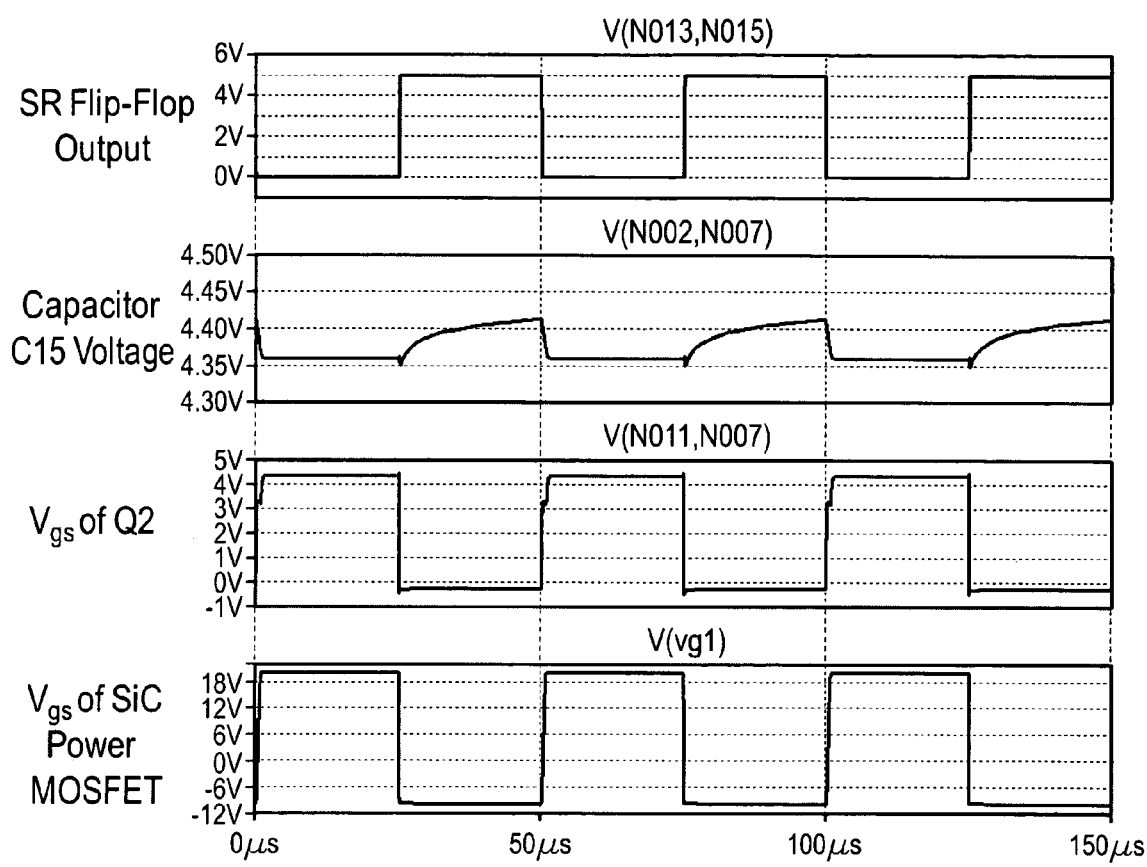
FIG. 21 shows the waveforms for the threshold capacitor charging.

FIG. 18 shows a circuit schematic that includes the isolation transformer 1800, pulse reconstruction circuitry 1825, and the set-reset flip-flop 1850. As shown in FIG. 18, the outputs of the pulse generators 1514, 1516 are connected differentially across the isolation transformer TX1 1806 through resistor R7 1802 and capacitor C38 1804. This action combines the two pulses into one signal shown in FIG. 20 as TX primary signal 2002. From this it can be seen that the output of the first pulse generator 1514 creates a positive voltage across the transformer's primary side while the output of the second pulse generator 1516 creates a negative voltage across the transformer's primary side. Returning to FIG. 18, the pulse reconstruction circuitry 1825 consists of a rectifier using diodes 1827, 1828, 1829, 1830 which level shifts the transformer output depending upon its polarity. For a positive output pulse, diodes D5 1828 and D6 1829 conduct which activates the reset input 1852 to the set-reset flip-flop 1856. For a negative pulse, diodes D3 1827 and D4 1830 conduct which activates the set input 1854 to the set-reset flip-flop 1856. In FIG. 20, the set pulse signal 2004 and reset pulse signal 2006 are shown. As noted by FIG. 18, the set-reset flip-flop 1856 is a common configuration of a 555 timer. A low pulse on the set input 1854 will make the output 1858 go high and a low pulse on the reset input 1852 will make the output 1858 go low. Note that the components D10 1860, R16 1862, and C17 1864 provide an initial set pulse at startup to ensure the gate driver output 1858 will initially be low.

Figure 19:
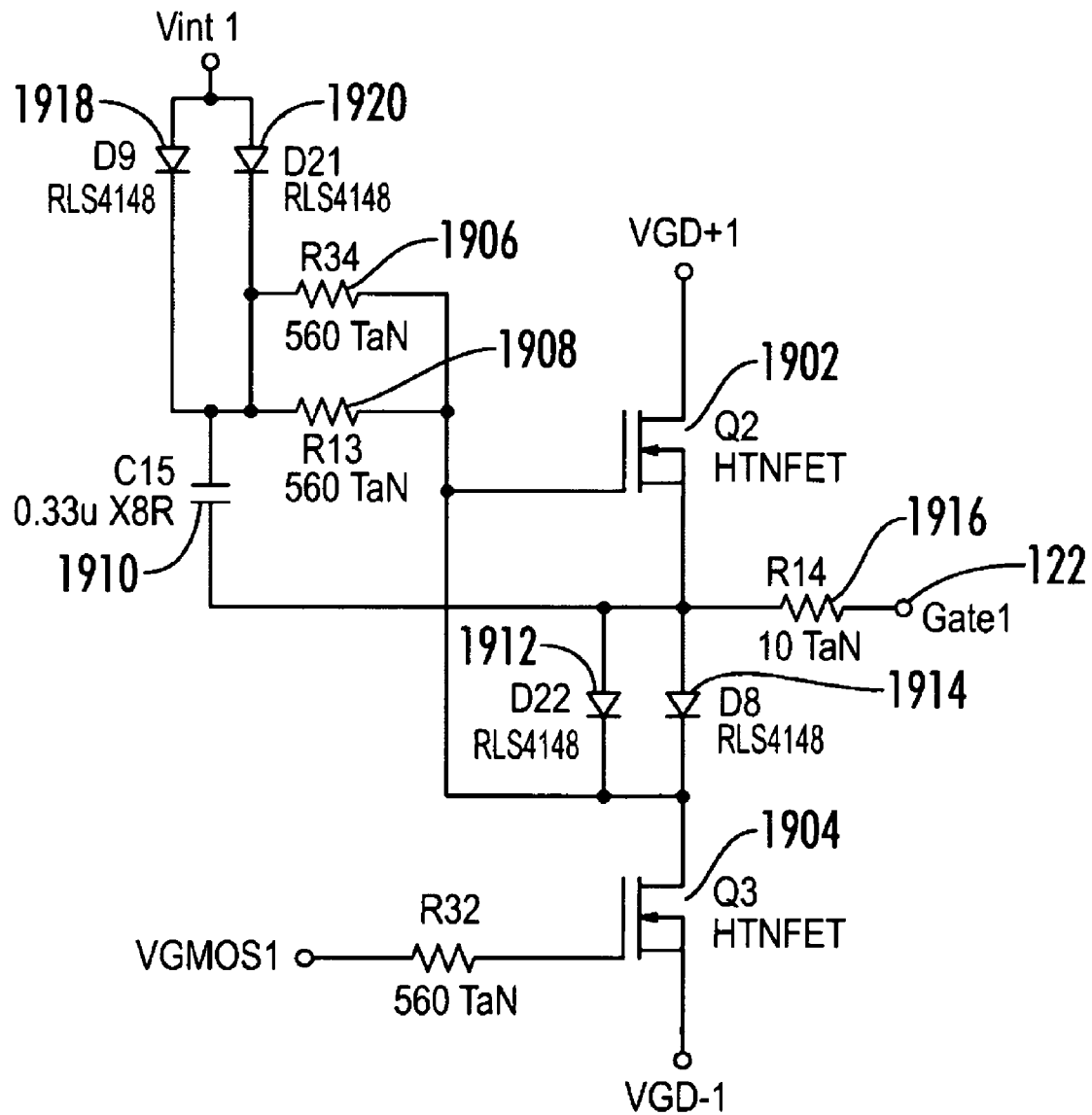
FIG. 19 is the circuit schematic for the driver circuitry.

FIG. 19 shows the driver circuitry for generating the gate output 122 and FIG. 20 shows the wave forms associated with the circuitry in FIGS. 18 and 19. When the output of the flip-flop VGMOS1 1856 in FIG. 18 goes low, Q3 1904 turns off The gate of Q2 1902 charges through R13 1908 and R34 1906 from the bootstrap capacitor C15 1910. The bootstrap capacitor 1910 floats with the source of Q2 1902 and provides the gate voltage to Q2 1902 while the driven power transistor is on due to the gate signal 122. Previous designs that did not include the bootstrap capacitor 1910 showed increased power dissipation in Q2 1902 and very high output impedance when in the on state which can make the output of the gate driver more susceptible to noise. When the gate voltage of Q2 1902 gets high enough, diodes D22 1912 and D8 1914 stop conducting and Q2 1902 turns on. The gate of the power transistor then charges to the positive drive voltage through Q2 1902 and R14 1916. When the output of the flip-flop 1856 goes high, Q3 1904 turns on. This pulls down the gate of Q2 1902. When the Q2 1902 gate voltage becomes low enough, Q2 1902 turns off and diodes D22 1912 and D8 1914 conduct. The gate of the driven power transistor through gate signal 122 then discharges to the negative drive voltage through R14 1916, D22 1912 and D8 1914, and Q3 1904. The bootstrap capacitor C15 1910 is charged through D9 1918, D21 1920, D22 1912, D8 1914, and Q3 1904. This circuit is similar to the one previously presented in FIG. 8. Once again, previously screened passives, capacitors, resistors, magnetic cores, etc., were used to fabricate the high temperature version of this driver and HTSOI components, analog switches, 555 timers, NFETs, were used as active components. FIGS. 22a and 22b show the complete gate drive schematic for this circuit.

FIGS. 23-26 show the amplitude shift keysing modification for the gate driver 1100. The previous HTSR, high temperature set-reset gate driver encoded the PWM signal into two short pulses: one to represent a turn-on event and another to represent a turn-off event. This action was illustrated in FIG. 16. In that design, the rising edge of the PWM signal creates the first pulse and the falling edge creates the second pulse. These pulses are then sent across the isolation transformer and decoded into the original PWM signal. Due to the high frequency content of the pulses, the transformer interwinding capacitance and physical size were greatly reduced. We discovered that the pulse method has problems with noise immunity. If high frequency noise is coupled into the signal path it may be interpreted as a pulse itself, therefore causing distortion in the PWM reconstruction. Since the typical frequency of induced noise is on the same order of magnitude as the generated pulses, the noise is very difficult to filter. Any circuitry added to filter noise will also filter the pulses. Thus, we have developed a further modification to address this problem.

The main objective for the recent modification of the gate driver is to increase noise immunity while keeping the desirable transformer characteristics of low interwinding capacitance and small size. The basic idea of the new modification is to replace the single pulses with a train of pulses, specifically using amplitude shift keying ASK. Since ASK is a form of amplitude modulation, the new driver is termed the HTAM high temperature amplitude modulated gate driver shown in a complete schematic in FIG. 26. Many other modulation schemes can be used and some have much better noise rejection characteristics than ASK. Frequency shift keying, or FSK, would be the next logical step. The main reason for choosing ASK over another modulation scheme is the ease of conversion from the previous design.

Figure 23:
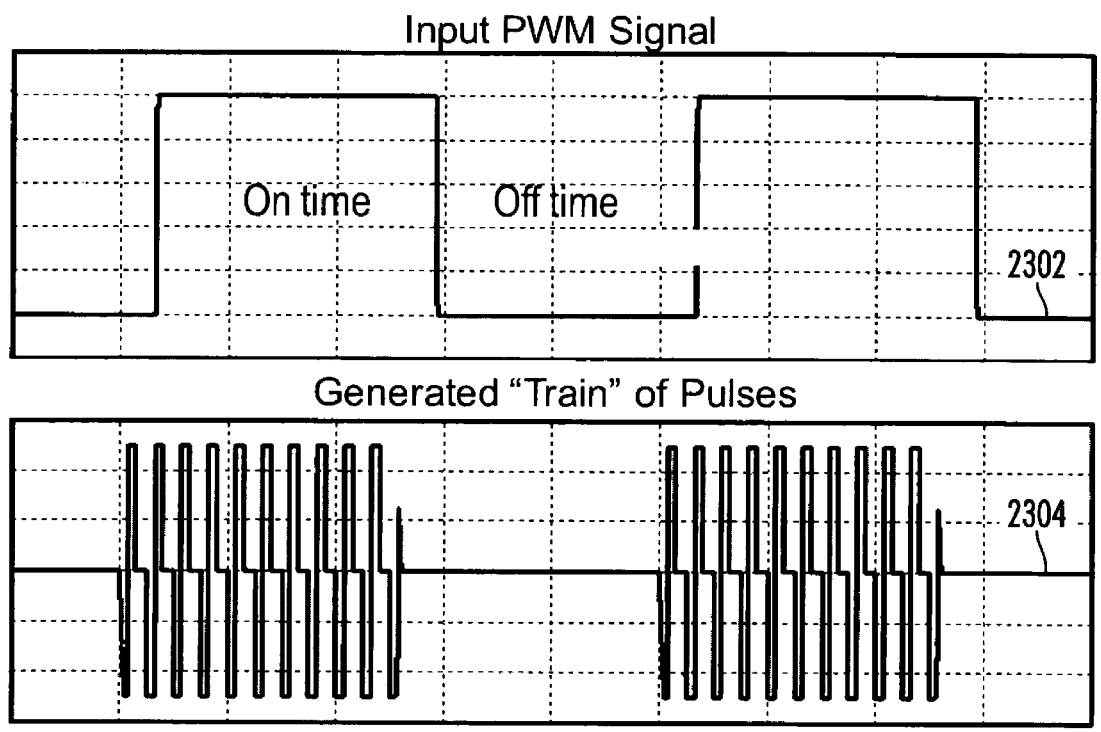
FIG. 23 shows the theoretical waveforms for the amplitude modulation isolation transformer crossing signal.

FIG. 23 shows how ASK works in this application. The top trace 2302 is the PWM signal and the second trace is the modulated PWM signal 2304 sent across the isolation barrier transformer 2506 in FIG. 26. The absence of the carrier represents a logic low and the presence of the carrier represents a logic high. An alternative would be to change the logic high and low such that noise could turn the circuit off as a default if this was needed for a particular application. The signal is then demodulated on the secondary side of the transformer into the original PWM signal. The advantage of using this approach is that the train of pulses, or lack thereof, can be rectified to produce a new signal with strong dc components. Thus, a train of pulses is the on signal and a low level or single noise pulse is not a signal because it does not generate a DC value. Now the amplitude modulated signal can be heavily filtered without significantly distorting the original signal. Note that the amount of filtering will affect the propagation delay between the PWM signal and the gate driver output.

Figure 24A:
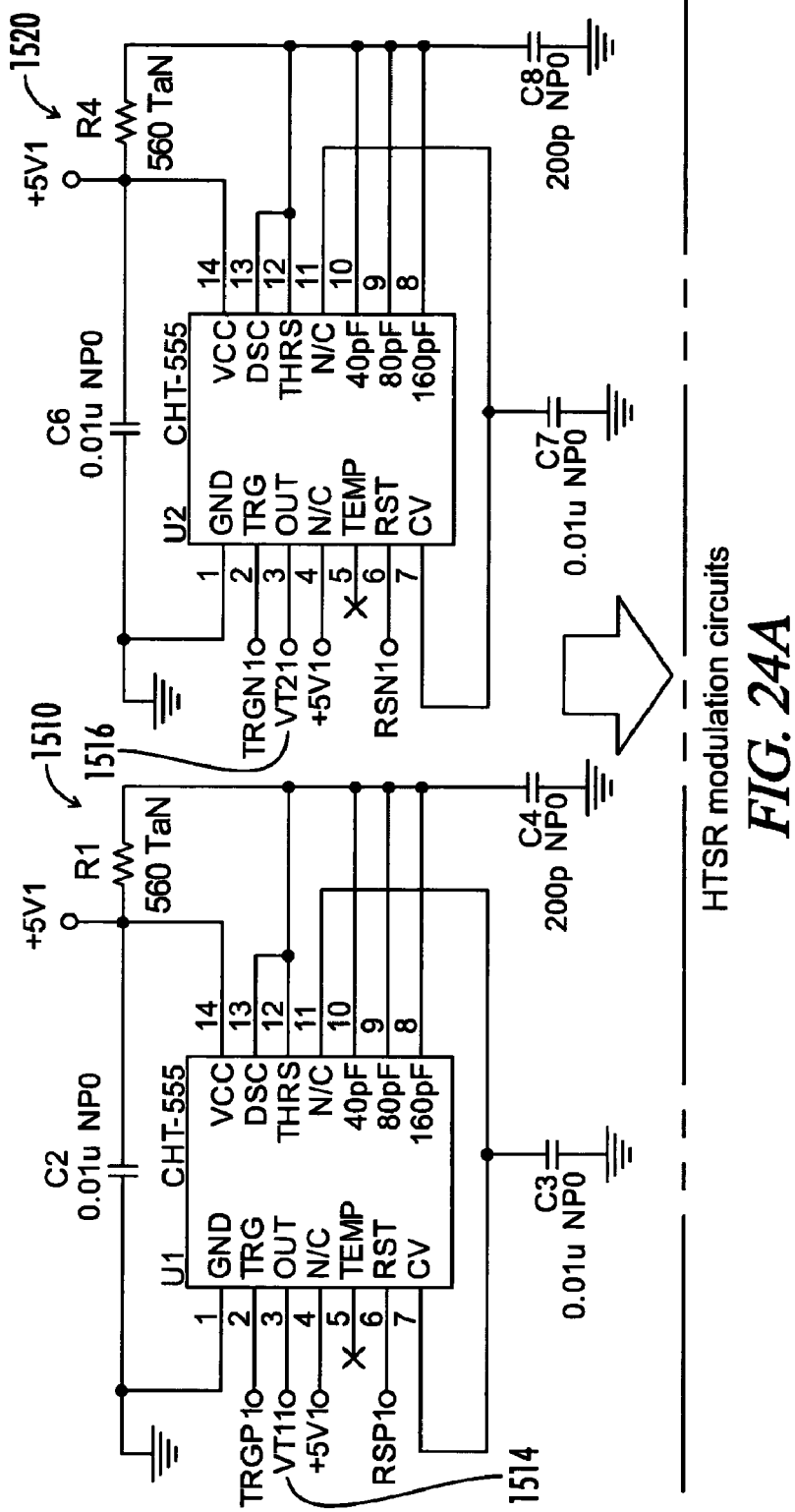
Figure 24B:
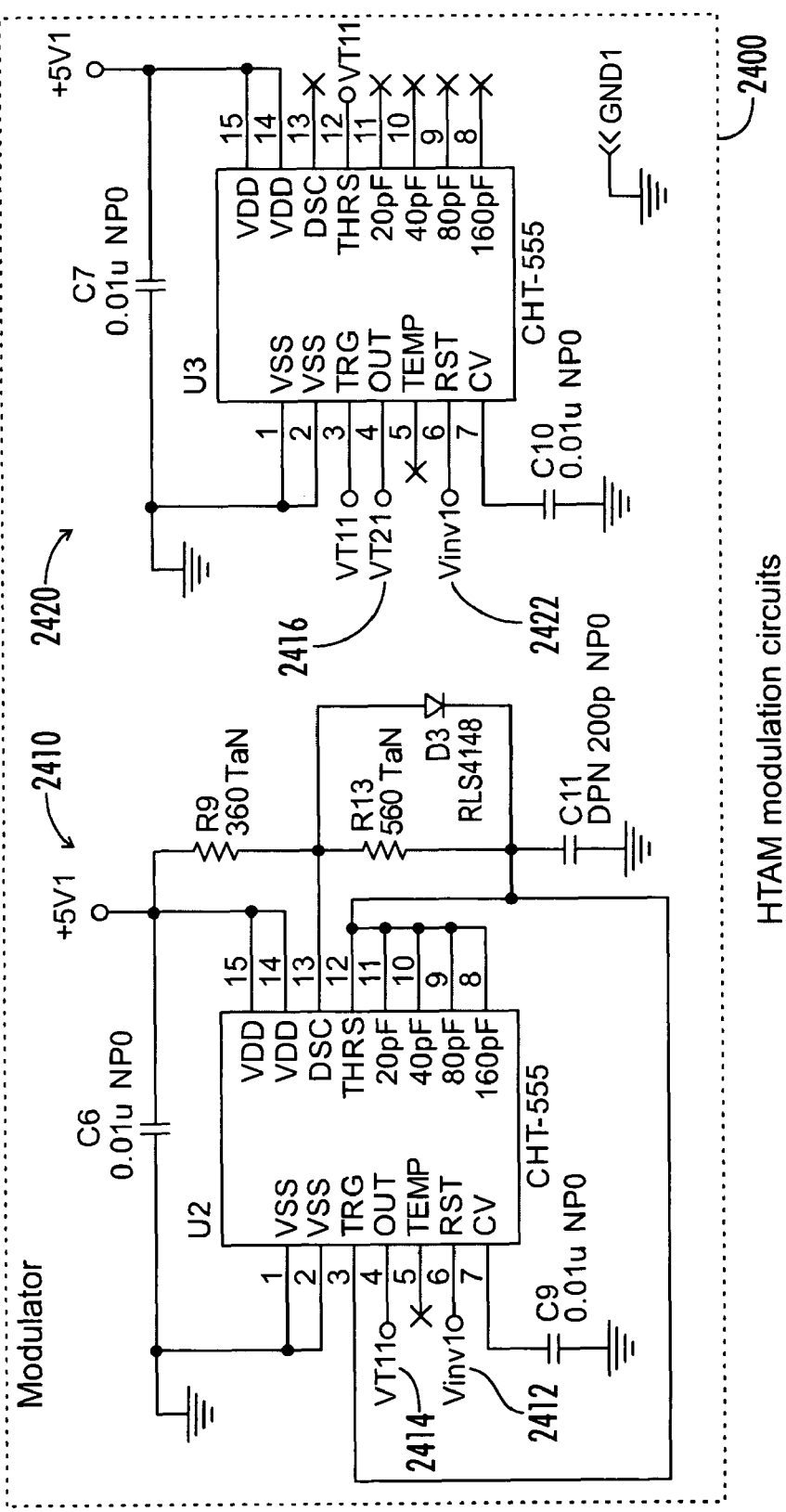

As mentioned previously, ASK was chosen because of the ease of conversion from the previous design. This is because many of the same components are used in the HTAM gate driver as the HTSR gate driver, but they are configured differently. FIG. 24 shows the conversion of the modulation section from the HTSR (top) version to the HTAM (bottom) version. As previously noted in the HTSR version shown on top, the two 555 timers 1510, 1520 of the HTSR are configured as one-shots so that an edge of a signal will cause a single pulse output of fixed duration. One timer creates the turn-on pulse 1510 and the other creates the turn-off pulse 1520. These two pulses are combined differentially across the isolation transformer at points VT11 1514 and VT21 1516. In contrast as shown in the bottom schematic, the HTAM driver uses the same timers but now one is configured as an oscillator 2410 and the other as an inverter 2420. The PWM signal controls the reset pins 2412, 2422 of both timers 2410, 2420. When the reset pins 2412, 2422 are high, the two timers 2410, 2420 behave as they are configured. The first timer 2410 creates a carrier signal and the second inverts it 2420. These two signals 2414, 2416 are applied across the isolation transformer 2506 shown in FIG. 25. The inverted signal 2416 is needed to create a +/−signal across the transformer 2506 so it does not saturate or cause undesirable transients on the coupling capacitor. Now, when the reset pins 2412, 2422 go low, both timer outputs 2414, 2416 go low. If both timers 2410, 2420 did not reset, one of them will be at logic high and the other at logic low, which will cause saturation of the transformer 2506.

Figure 25:
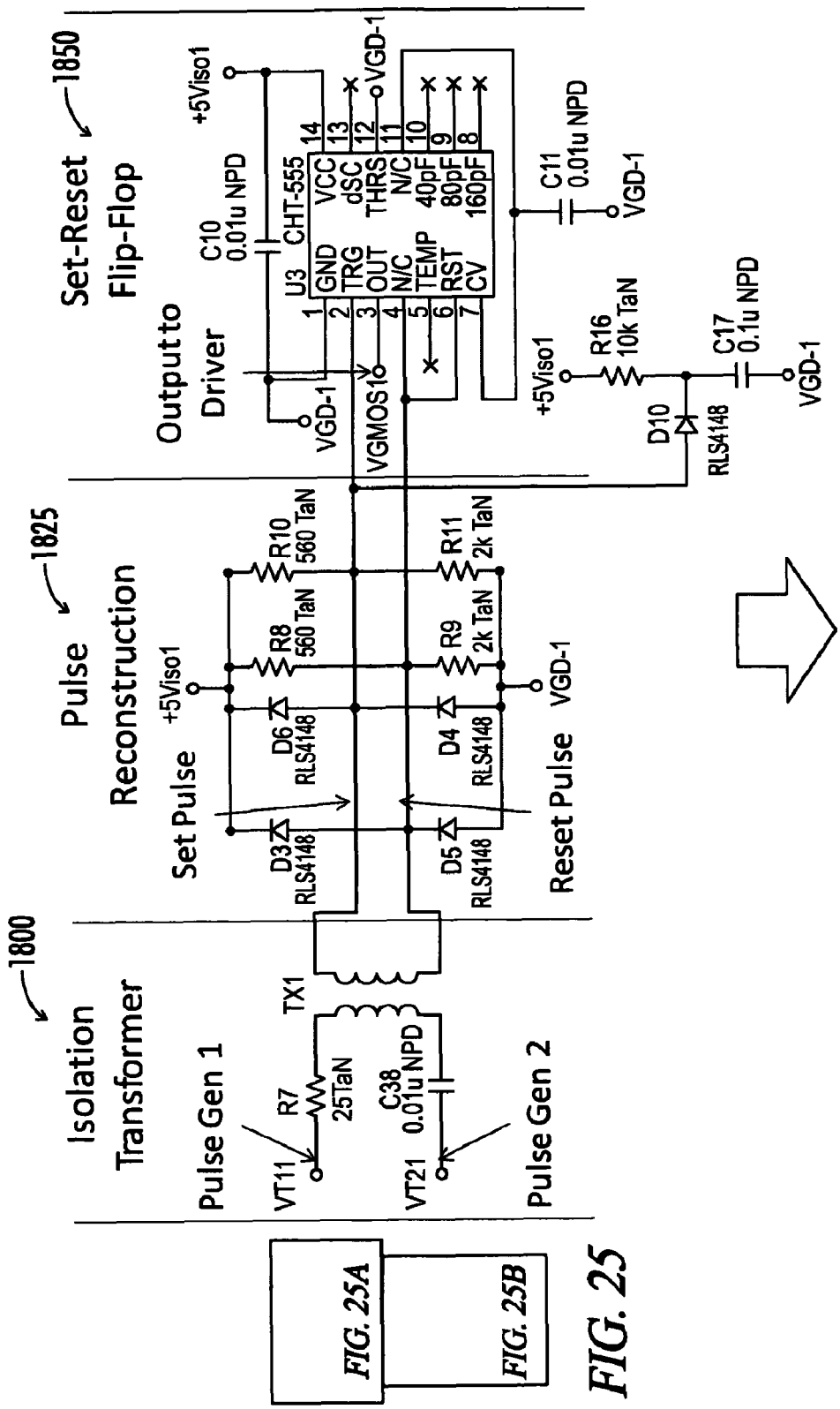
Figure 25B:
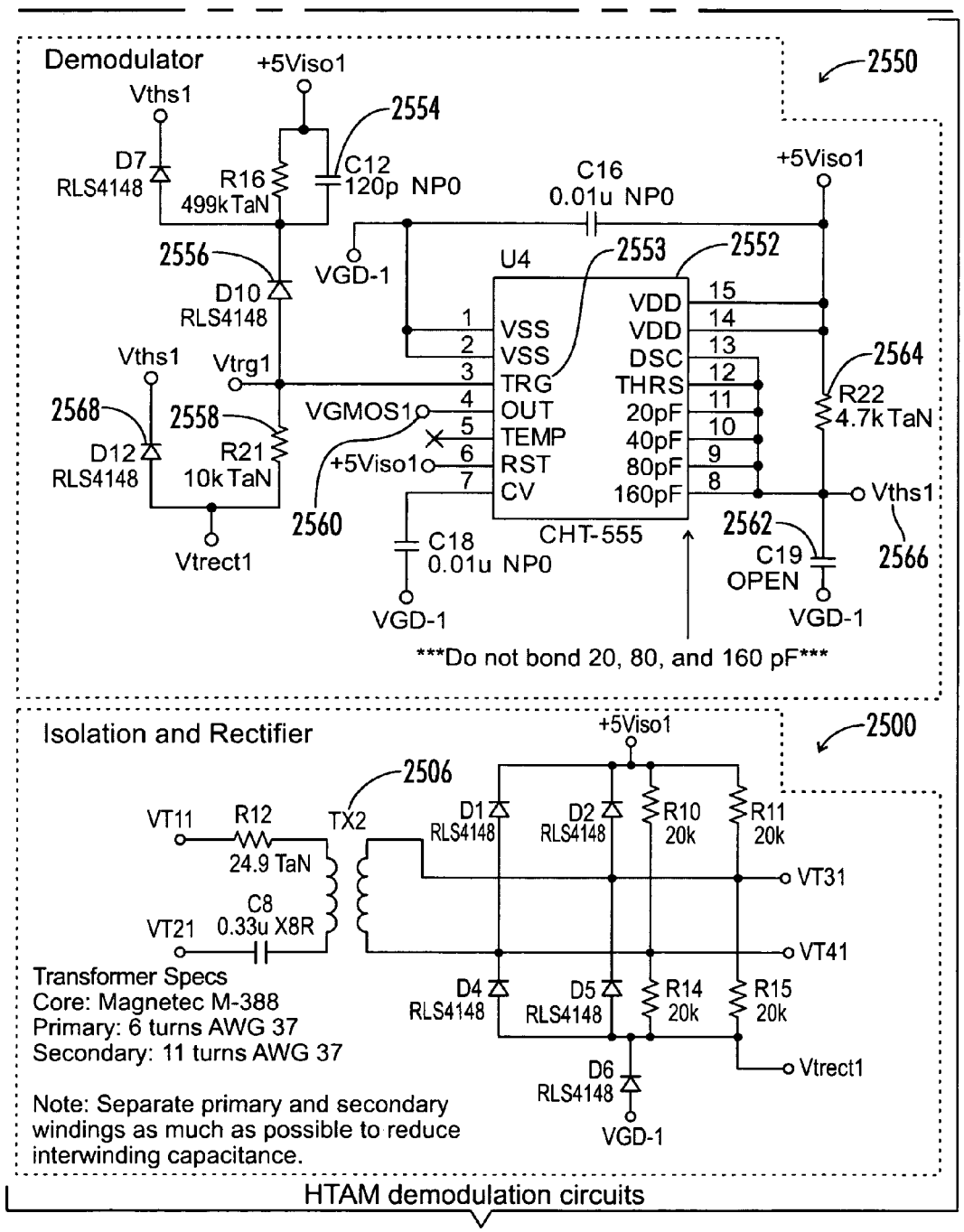
Figure 26A:
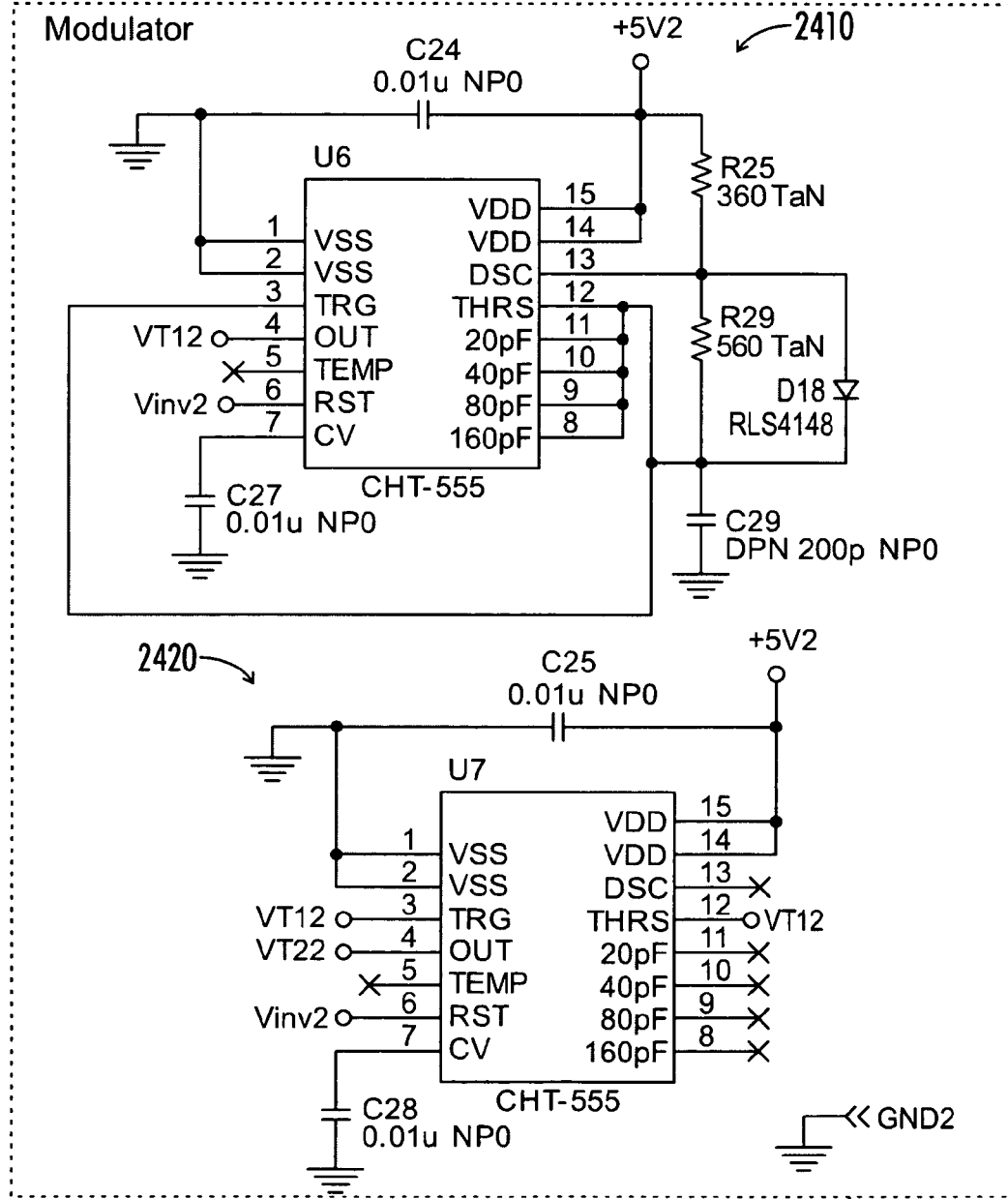
Figure 26B:
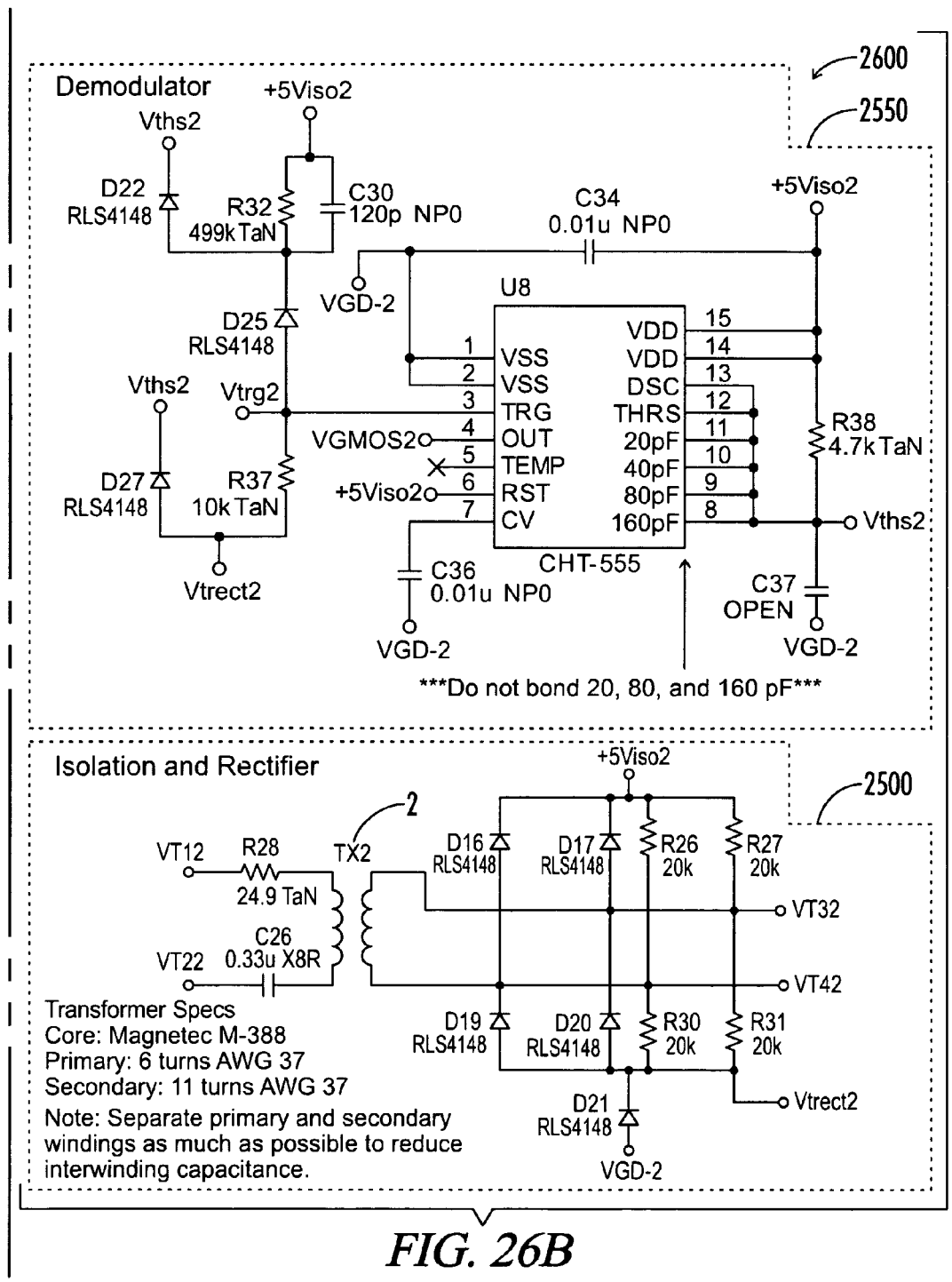
Figure 26C:
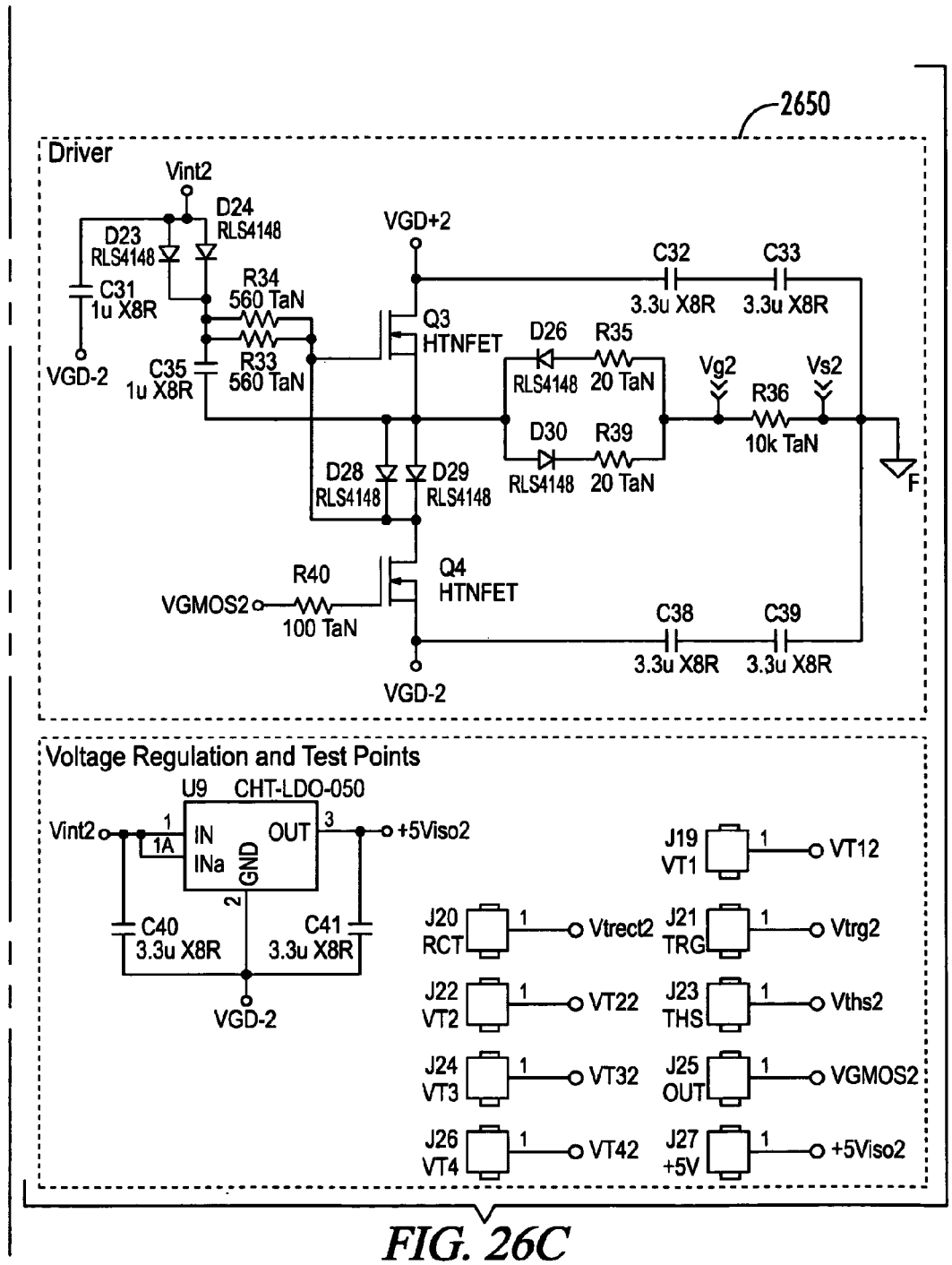

FIG. 25 shows the difference in the demodulation circuits of the HTSR (top) version and the HTAM (bottom) version. Remember that the HTSR, the signal was separated into positive and negative pulses. One polarity will be the turn-on pulse and the other polarity will be the turn-off pulse. These two signals then control the "set" and "reset" pins of a set-reset flip-flop made with a 555 timer; hence the name high temperature set-reset (HTSR) gate driver. The flip-flop then decoded the pulse signals into the original PWM signal. For the HTAM isolation and rectifier 2500, both polarities of the transformer 2506 are rectified. The demodulator 2550 uses the rectified signal for reconstruction. The trigger pin 2553 of the 555 timer 2552 then slowly decreases due to charging of C12 2554 through D10 2556 and R21 2558. This capacitor 2554 charging filters noise from the incoming signal 102. Once the trigger 2553 is activated, the output 2560 goes high and capacitor C19 2562 at the threshold pin is allowed to charge through R22 2564. As long as a train of pulses exist coming from the transformer 2506, the threshold pin 2566 will be pulled low through D12 2568. Once the train of pulses stop, the threshold pin 2566 charges up and makes the timer output 2560 go low. The threshold capacitor 2562 also acts as a noise filter. Additionally, when the threshold pin 2566 charges up, it resets the voltage on C12 2554 which allows the next transition to be filtered. FIG. 26 provides the complete schematic for the HTAM modulator 2400, HTAM isolation and rectifier 2500, HTAM demodulator 2550 and HTAM driver 2650 blocks.

Reference numerals used throughout the detailed description and the drawings correspond to the following elements:

From the foregoing, it will be seen that this invention well adapted to obtain all the ends and objects herein set forth, together with other advantages which are inherent to the structure. It will also be understood that certain features and subcombinations are of utility and may be employed without reference to other features and subcombinations. This is contemplated by and is within the scope of the claims. Many possible embodiments may be made of the invention without departing from the scope thereof. Therefore, it is to be understood that all matter herein set forth or shown in the accompanying drawings is to be interpreted as illustrative and not in a limiting sense.

When interpreting the claims of this application, method claims may be recognized by the explicit use of the word 'method' in the preamble of the claims and the use of the 'ing' tense of the active word. Method claims should not be interpreted to have particular steps in a particular order unless the claim element specifically refers to a previous element, a previous action, or the result of a previous action. Apparatus claims may be recognized by the use of the word 'apparatus' in the preamble of the claim and should not be interpreted to have 'means plus function language' unless the word 'means' is specifically used in the claim element. The words 'defining,' 'having,' or 'including' should be interpreted as open ended claim language that allows additional elements or structures. Finally, where the claims recite "a" or "a first" element of the equivalent thereof, such claims should be understood to include incorporation of one or more such elements, neither requiring nor excluding two or more such elements.

What is claimed is:

1. An amplitude modulated isolated gate driver method for generating a pulse width modulated output signal, the circuit comprising:
   receiving a pulse width modulated input signal having a first state and a second state;
   generating a generated signal including a positive-negative oscillating output signal during the first state and an off signal during the second state;
   isolating the generated signal using a transformer to create an isolated oscillating signal;
   rectifying the isolated oscillating signal to create an isolated rectified signal;
   controlling a threshold capacitor charge level with the isolated rectified signal; and
   generating a pulse width modulated output signal using the threshold capacitor charge level.

2. The method of claim 1, further comprising:
   generating the generated signal using a first timer connected as an oscillator and a second timer connected as an inverter.

3. The method of claim 1, further comprising:
   isolating the generated signal using a transformer with windings with less than 100 turns on every winding.

4. The method of claim 1, further comprising:
   isolating the generated signal using a transformer with windings with less than 50 turns on every winding.

5. The method of claim 1, further comprising:
   isolating the generated signal using a transformer with windings with less than 25 turns on every winding.

6. The method of claim 1, further comprising:
   isolating the generated signal using a transformer with windings with less than 12 turns on every winding.

7. An amplitude modulated isolated gate driver circuit apparatus receiving a pulse width modulated input signal having a first state and a second state and generating a pulse width modulated output signal, the circuit comprising:
   an oscillator electrically connected to the pulse width modulated input signal;
   an inverter electrically connected to the oscillator;
   an isolating transformer having a first side and a second side, the first side electrically connected across the oscillator and the inverter;
   a rectifier electrically connected across the second side;
   a threshold capacitor electrically connected to the rectifier; and
   a gate driver electrically connected to the threshold capacitor.

8. The apparatus of claim 7, further comprising:
   the oscillator trigger by the first state generating an original oscillating output signal, the oscillator turning off during the second state to generate a first off signal;
   the inverter triggered by the first state, the inverter connected to the oscillator to receive the original oscillating output signal and generate an inverted oscillating output signal, the inverter turning off during the second state to generate a second off signal;
   the isolating transformer having a first side and a second side, the first side connected across the oscillator and the inverter to generate a transformer oscillating signal when the original and inverted oscillating output signals are received and generate a transformer off signal when the first and second off signals are received;

the rectifier connected across the second side to generate a rectified signal from the transformer oscillating signal and a rectifier off signal from the transformer off signal.

9. The apparatus of claim 7, further comprising:
the threshold capacitor having a charge level controlled by the rectifier; and
the gate driver generating a pulse width modulated output signal associated with the charge level of the threshold capacitor.

10. The apparatus of claim 7, further comprising:
the oscillator implemented with a 555 timer.

11. The apparatus of claim 7, further comprising:
the inverter implemented with a 555 timer.

12. The apparatus of claim 7, further comprising:
the isolating transformer having windings with less than 25 turns.

13. A gate driving circuit for receiving a pulse width modulated input signal at an input and generating a power switch signal at an output, the circuit comprising:
a filter input circuit receiving the pulse width modulated input signal and generating a filtered output;
a first pulse generator circuit receiving the filtered output and generating a rising pulse;
an inverter circuit receiving the filtered output and generating an inverted output;
a second pulse generator circuit receiving the inverted output and generating a falling pulse;
an isolation transformer circuit receiving the rising pulse and the falling pulse and generating an isolated pulse sequence;
a pulse reconstruction circuit receiving the isolated sequence and generating an on-off sequence;
a set-reset circuit receiving the on-off sequence and generating a pulse width signal; and
a driver circuit receiving the pulse width signal and generating the power switch signal.

14. The circuit of claim 13, the filter circuit comprising:
a first nmos transistor having a first drain connected to a power input, the first nmos transistor also having a first gate, and the first nmos transistor also having a first source connected to a filter output;
a second nmos transistor having a second drain, the second nmos transistor also having a second gate, and the second nmos transistor also having a second source connected to a power reference;
a diode having an anode connected to the filter output and a cathode connected to the second drain;
a first resistor connected from the cathode to the first gate;
a second resistor connected from the power input to the cathode;
a third resistor connected from the second gate to the pulse width modulated input signal; and
a fourth resistor connected from the power input to the pulse width modulated input signal.

15. The circuit of claim 13, the filter circuit comprising:
a first nmos transistor having a first drain connected to a power input, the first nmos transistor also having a first gate, and the first nmos transistor also having a first source connected to a filter output;
a second nmos transistor having a second drain, the second nmos transistor also having a second gate, and the second nmos transistor also having a second source connected to a power reference;
a first diode having a first anode connected to the output and a first cathode connected to the second drain and the first gate;
a second diode having a second anode connected to the power input and a second cathode;
a first resistor connected to the second cathode and the first gate;
a first capacitor connected to the second cathode and the output;
a third resistor connected from the second gate to the input signal; and
a fourth resistor connected from the power input to the input signal.

16. The circuit of claim 13, the driver circuit comprising:
a first nmos transistor having a first drain connected to a power input, the first nmos transistor also having a first gate, and the first nmos transistor also having a first source connected to the output;
a second nmos transistor having a second drain connected to the output, the second nmos transistor also having a second gate connected to the signal input, and the second nmos transistor also having a second source connected to a power reference;
a third nmos transistor having a third drain connected to the first gate, the third nmos transistor also having a third gate connected to the signal input, and the third nmos transistor also having a third source connected to the power reference; and
a first resistor connected between the power input and the first gate.

* * * * *